United States Patent
Ruan

(10) Patent No.: US 11,425,278 B2
(45) Date of Patent: Aug. 23, 2022

(54) STORAGE MEDIUM STORING INSTRUCTIONS FOR CAUSING MOBILE TERMINAL TO COMMUNICATE WITH COMMUNICATION DEVICE BASED ON WHETHER WIRELESS CONNECTION BETWEEN MOBILE TERMINAL AND COMMUNICATION DEVICE VIA ACCESS POINT IS ESTABLISHED

(71) Applicant: Brother Kogyo Kabushiki Kaisha, Nagoya (JP)

(72) Inventor: Longlong Ruan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 8 days.

(21) Appl. No.: 17/102,945

(22) Filed: Nov. 24, 2020

(65) Prior Publication Data

US 2021/0084193 A1 Mar. 18, 2021

Related U.S. Application Data

(63) Continuation of application No. 16/425,266, filed on May 29, 2019, now Pat. No. 10,868,941.

(30) Foreign Application Priority Data

Sep. 28, 2018 (JP) .............................. JP2018-185708

(51) Int. Cl.
*H04N 1/44* (2006.01)
*H04W 76/14* (2018.01)
(Continued)

(52) U.S. Cl.
CPC ......... *H04N 1/4413* (2013.01); *G06F 3/1204* (2013.01); *G06F 3/1222* (2013.01);
(Continued)

(58) Field of Classification Search
None
See application file for complete search history.

(56) References Cited

U.S. PATENT DOCUMENTS

| 2013/0250357 | A1* | 9/2013 | Yu | H04W 4/80 358/1.15 |
| 2017/0099570 | A1* | 4/2017 | Yamada | H04W 76/18 |

(Continued)

FOREIGN PATENT DOCUMENTS

| JP | 2013-201687 A | ‡ 10/2013 | ............ H04W 12/06 |
| JP | 2013-201687 A | 10/2013 | |
| JP | 2017-188869 A | 10/2017 | |

OTHER PUBLICATIONS

Wi-Fi Alliance Technical Committee P2P Task Group, "Wi-Fi Peer-to Peer (P2P) Technical Specification", Version 1.1, pp. 1-159, 2010.‡

(Continued)

*Primary Examiner* — Andrew H Lam
(74) *Attorney, Agent, or Firm* — Banner & Witcoff, Ltd.

(57) ABSTRACT

A mobile terminal includes: a user interface; and first and second interfaces. The mobile terminal is configured to execute: determining whether to set the user interface to an allowing state allowing a password of an access point to be entered; based on determining to set the user interface to the allowing state, setting the user interface to the allowing state; after the mobile terminal performs a specific communication using a first communication method with a device via the first interface, transmitting, to the device, the password entered via the user interface; after the device connects the access point using the transmitted password, communicating with the device via the access point; and based on determining not to set the user interface to the allowing state and after the specific communication is performed, communicating with the device using a second communication (Continued)

method via the second interface without intervention of the access point.

20 Claims, 9 Drawing Sheets

(51) Int. Cl.
  *G06F 3/12* (2006.01)
  *H04W 12/06* (2021.01)
(52) U.S. Cl.
  CPC .......... *G06F 3/1236* (2013.01); *G06F 3/1238* (2013.01); *H04W 76/14* (2018.02); *G06F 3/1292* (2013.01); *H04W 12/06* (2013.01)

(56) References Cited

U.S. PATENT DOCUMENTS

| | | |
|---|---|---|
| 2017/0223748 A1 | 8/2017 | Sumiuchi et al. |
| 2019/0073573 A1 ‡ | 3/2019 | Yu .............................. B41J 3/36 |

OTHER PUBLICATIONS

Jun. 28, 2022—(JP) Notice of Reasons for Refusal—App 2018-185705, Eng Tran.

\* cited by examiner
‡ imported from a related application

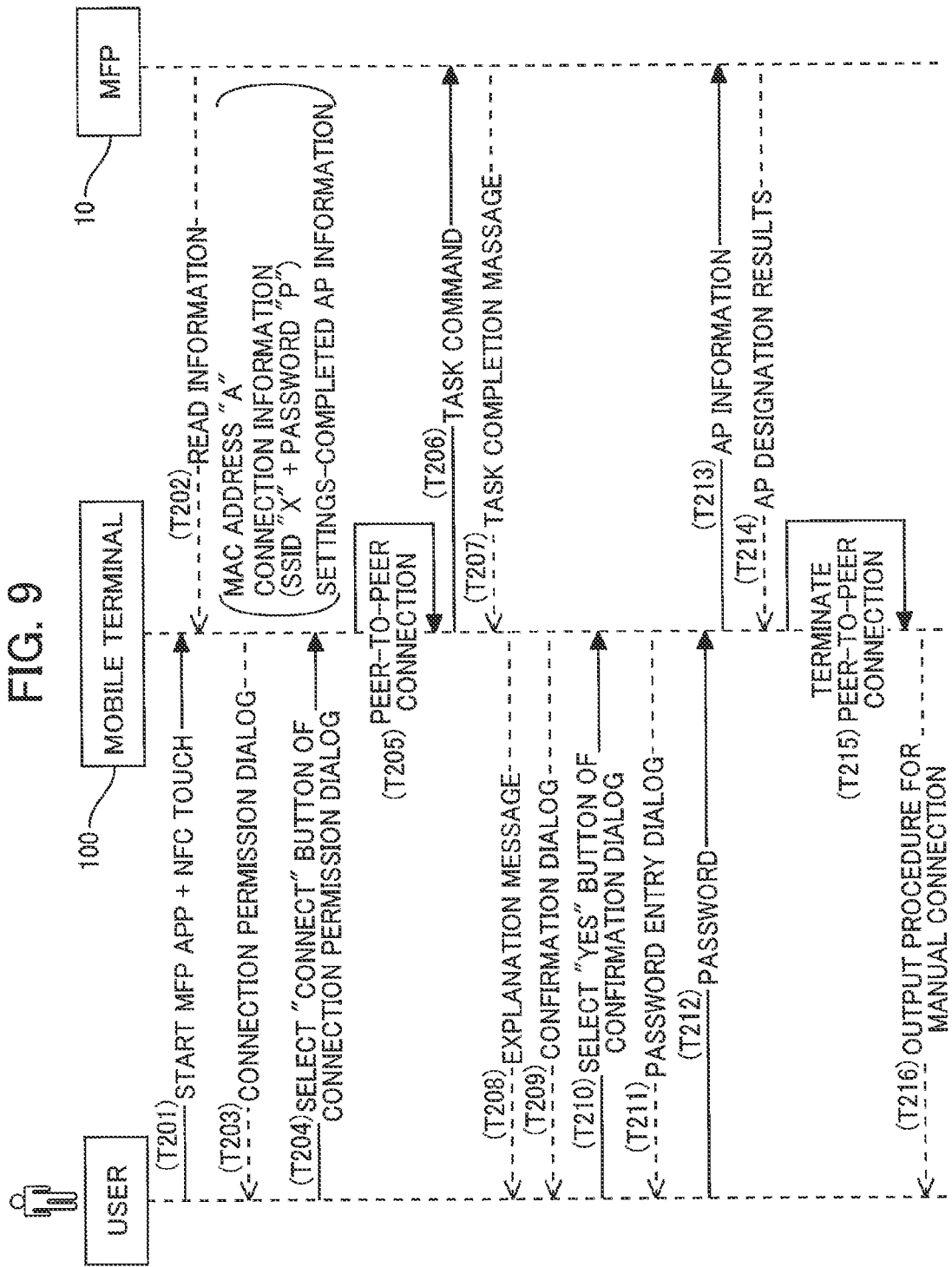

STORAGE MEDIUM STORING INSTRUCTIONS FOR CAUSING MOBILE TERMINAL TO COMMUNICATE WITH COMMUNICATION DEVICE BASED ON WHETHER WIRELESS CONNECTION BETWEEN MOBILE TERMINAL AND COMMUNICATION DEVICE VIA ACCESS POINT IS ESTABLISHED

CROSS REFERENCE TO RELATED APPLICATION

This application is a continuation of prior application Ser. No. 16/425,266, filed May 29, 2019, which application claims priority from Japanese Patent Application No. 2018-185708 filed on Sep. 28, 2018, the contents of which are incorporated herein by reference in their entirety.

TECHNICAL FIELD

Aspects described herein relate to a non-transitory computer-readable storage medium storing computer-readable instructions, a mobile terminal, and a communication device.

BACKGROUND

In some known technique, a mobile terminal such as a smartphone enables a printer to connect to a particular access point. The mobile terminal obtains an ID of the access point through wireless interactive communication with the access point. In most cases, a user knows a password of the access point and thus enters the password into the mobile terminal at an appropriate timing. The mobile terminal transmits, to the printer, the obtained ID of the access point and the entered password via tag communication. The printer thus establishes a connection with the access point based on the received ID and password.

SUMMARY

Nevertheless, in some cases, the user might not know the password of the access point and thus is unable to enter the password into the mobile terminal. The known technique, however, might not disclose provisions for such a situation.

In view of the foregoing, it is an object of the disclosure to provide a technique that can increase user friendliness by performing appropriate processing in a mobile terminal even if the user is unable to enter a password of a connection-target access point into the mobile terminal.

In order to attain the above and other objects, according to one aspect, the disclosure provides a non-transitory computer-readable storage medium storing computer-readable instructions for a mobile terminal. The mobile terminal includes; a processor; a user interface; a first communication interface enabling the mobile terminal to perform communication using a first communication method; and a second communication interface enabling the mobile terminal to perform communication using a second communication method different from the first communication method. The computer-readable instructions, when executed by the processor, causes the mobile terminal to execute: (1a) determining whether to set the user interface to an allowing state in which the user interface allows a password to be entered, the password being required for a communication device to establish a connection with an access point; based on determination made in the (1a) determining to set the user interface to the allowing state, (1b) setting the user interface to the allowing state; after the password is entered via the user interface in the allowing state and a specific communication using the first communication method is performed between the mobile terminal and the communication device via the first communication interface, (1c) transmitting first information to the communication device, the first information relating to the access point and including the password; after the (1c) transmitting is executed and a connection between the communication device and the access point is established using the transmitted first information, (1d) communicating with the communication device via the access point to which the communication device is connected; and based on determination made in the (1a) determining not to set the user interface to the allowing state and after the specific communication using the first communication method is performed, (1e) communicating with the communication device using the second communication method via the second communication interface without intervention of the access point.

According to another aspect, the disclosure provides a mobile terminal including: a user interface; a first communication interface for performing communication using a first communication method; a second communication interface for performing communication using a second communication method different from the first communication method; and a controller. The controller is configured execute: (16a) determining whether to set the user interface to an allowing state in which the user interface allows a password to be entered, the password being required for a communication device to establish a connection with an access point; based on determination made in the (16a) determining to set the user interface to the allowing state, (16b) setting the user interface to the allowing state; after the password is entered via the user interface in the allowing state and a specific communication using the first communication method is performed between the mobile terminal and the communication device via the first communication interface, (16c) transmitting specific information to the communication device, the specific information relating to the access point and including the password; after the (16c) transmitting is executed and a connection between the communication device and the access point is established using the transmitted specific information, (16d) communicating with the communication device via the access point to which the communication device is connected; and based on determination made in the (16a) determining not to set the user interface to the allowing state and after the specific communication using the first communication method is performed, (16e) communicating with the communication device using the second communication method via the second communication interface without intervention of the access point.

According to still another aspect, the disclosure provides a communication device including: a first communication interface for performing communication using a first communication method; a second communication interface for performing communication using a second communication method different from the first communication method; and a controller. The controller is configured to execute: after a specific communication using the first communication method is performed between the communication device and the mobile terminal via the first communication interface, (17a) determining whether specific information has been received from the mobile terminal, the specific information relating to an access point and including a password required to establish a connection with the access point;

based on determination made in the (17a) determining that the specific information has been received from the mobile terminal, (17b) establishing a connection with the access point using the received specific information; after the (17b) establishing is completed, (17c) communicating with the mobile terminal via the access point; and based on determination made in the (17a) determining that the specific information has been received from the mobile terminal, (17d) communicating with the mobile terminal using the second communication method without intervention of the access point.

The configurations according to the aspects of the disclosure can enable the mobile terminal to communicate with the communication device using the second communication protocol without requiring any access point although the user is unable to enter the password of the connection-target access point into the mobile terminal, thereby not requiring any user operation for solving the problem. Consequently, such a configuration may increase user friendliness.

BRIEF DESCRIPTION OF THE DRAWINGS

The particular features and advantages of the disclosure as well as other objects will become apparent from the following description taken in connection with the accompanying drawings, in which:

FIG. 9 is a sequence diagram illustrating communication performed between the mobile terminal and a communication device in a specific example case when the AP designation process is executed in the second illustrative embodiment according to one or more aspects of the disclosure.

DETAILED DESCRIPTION

Illustrative embodiments will be described with reference to the accompanying drawings.

1. First Illustrative Embodiment

1-1. Configuration

Communication System

Figure 1:
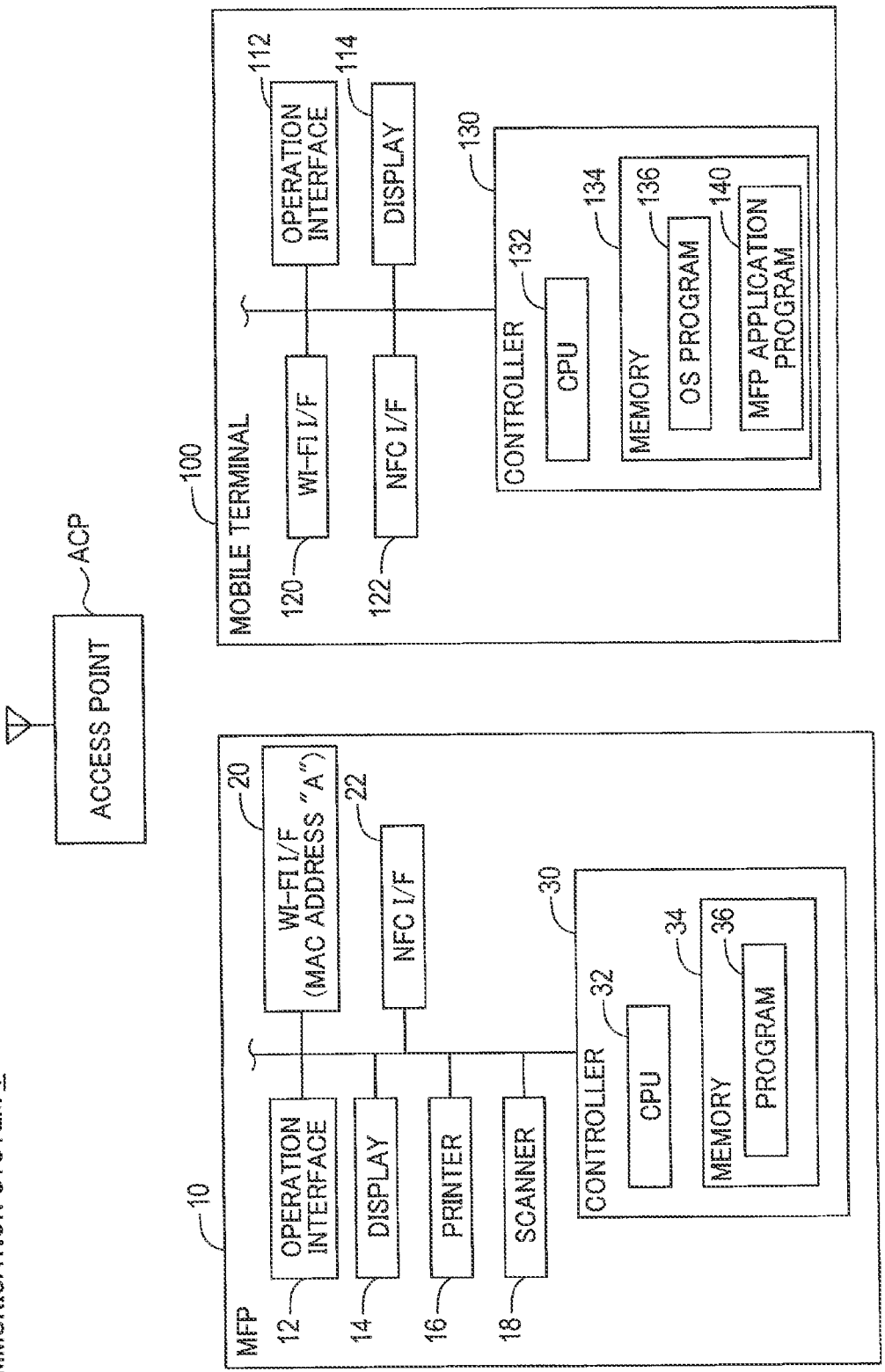
FIG. 1 is a block diagram illustrating a configuration of a communication system in illustrative embodiments according to one or more aspects of the disclosure.

As illustrated in FIG. 1, a communication system 1 includes a multifunction peripheral ("MFP") 10, a mobile terminal 100, and an access point ACP. The MFP 10 and the mobile terminal 100 are each configured to selectively perform wireless communication in compliance with a Wi-Fi (Wi-Fi is a registered trade mark owned by the Wi-Fi Alliance of Austin, Tex.) protocol (hereinafter, referred to as "Wi-Fi communication") and wireless communication in compliance with a Near Field Communication ("NFC") protocol (hereinafter, referred to as "NFC communication"). The MFP 10 and the mobile terminal 100 are each configured to perform wireless communication using a Wi-Fi Direct ("WFD") (Wi-Fi Direct is a registered trade mark owned by the Wi-Fi Alliance of Austin, Tex.) protocol in compliance with the Wi-Fi protocol. That is, the MFP 10 and the mobile terminal 100 are WFD-enabled devices.

MFP

The MFP 10 is configured to execute multiple functions such as a printing function and a scanning function. The MFP 10 may be a peripheral device for the mobile terminal 100. The MFP 10 includes an operation interface 12, a display 14, a printer 16, a scanner 18, a Wi-Fi interface ("I/F") 20, an NFC interface ("I/F") 22, and a controller 30, each of which is connected to a bus. The MFP 10 is an example of the claimed "communication device".

The operation interface 12 includes a plurality of keys or buttons (physical and/or virtual) and is configured to receive various user operations. The operation interface 12 enables a user to input various instructions to the MFP 10. The display 14 is configured to display various information thereon. The printer 16 includes a printing mechanism using a well-known recording method such as an inkjet method or a laser method. The scanner 18 includes a scanning mechanism using a well-known technique such as a charge-coupled device ("CCD") or a contact image sensor ("CIS").

The Wi-Fi I/F 20 is a wireless communication interface for enabling wireless communication that complies with the Wi-Fi protocol. The Wi-Fi I/F 20 is assigned a Media Access Control ("MAC") address (e.g., "A"). The Wi-Fi protocol is a wireless communication protocol (or protocol family) for performing wireless communication in compliance with, for example, the standard IEEE (The Institute of Electrical and Electronics Engineers, Inc.) 802.11 and its family standards (e.g., 802.11a, 802.11b, 802.11g, and 802.11n). The Wi-Fi I/F 20 supports the Wi-Fi Direct protocol developed by the Wi-Fi Alliance, and enables wireless communication in compliance with the WFD protocol (hereinafter, referred to as "WFD communication"). The WFD protocol is a wireless communication protocol (or protocol family) specified in "Wi-Fi Peer-to-Peer (P2P) Technical Specification Version 1.1" created by the Wi-Fi Alliance. The WFD standard defines three statuses of the WFD-enabled device: a group owner ("G/O") status, a client status, and a device status. The WFD-enabled device is configured to operate selectively in one of the three statuses. The Wi-Fi protocol is an example of the claimed "second communication method" and also is an example of the claimed "third communication method". The Wi-Fi protocol is an example of the claimed "Wi-Fi communication method". The Wi-Fi I/F 20 is an example of the claimed "second communication interface".

The NFC I/F 22 enables wireless communication that complies with the NFC protocol. The NFC protocol is a wireless communication protocol (or protocol family) in compliance with the International standard, e.g., ISO/IEC 14443, ISO/IEC 15693, or ISO/IEC 18092. The interfaces that enable NFC communication include an NFC Forum Device and an NFC Forum Tag. The NFC I/F 22 is an NFC Forum Device. The NFC I/F 22 is configured to operate selectively in one of a P2P mode, a Reader/Writer ("R/W") mode, and a Card Emulation ("CE") mode of the NFC protocol. It is assumed that, in the first illustrative embodiment, the NFC I/F 22 operates in the CE mode. The NFC protocol is an example of the claimed "first communication method" and also is an example of the claimed "Near Field Communication method". The NFC I/F 22 is an example of the claimed "first communication interface".

Here, differences between the Wi-Fi communication and the NFC communication are described. The Wi-Fi communication provides a communication speed faster than that in the NFC communication. More specifically, for example, the maximum communication speed in the Wi-Fi communication is between 11 and 600 Mbps and the maximum communication speed in the NFC communication is between 100 and 424 Kbps. Further, the Wi-Fi communication uses a different carrier frequency from that in the NFC communication. More specifically, for example, Wi-Fi communication uses a 2.4 GHz band or a 5.0 GHz band and the NFC communication uses a 13.56 MHz band. The maximum communicable range in the Wi-Fi communication is greater than the maximum communicable range in the NFC communication. More specifically, for example, the maximum communicable range in the Wi-Fi communication is approximately 100 m and the maximum communicable range in the NFC communication is approximately 10 cm. The maximum communicable range in the NFC communication (i.e., approximately 10 cm) is an example of the claimed "predetermined distance".

The controller 30 includes a CPU 32 and a memory 34. The CPU 32 is configured to execute various processing in accordance with a program 36 stored in the memory 34. The memory 34 may include a volatile memory and a nonvolatile memory. The memory 34 is a non-transitory computer readable storage medium.

Mobile Terminal

The mobile terminal 100 may be any portable device, examples of which include mobile phones, smartphones, personal digital assistants ("PDAs"), mobile computers such as general-purpose laptops, notebooks, or tablets, mobile music players, and mobile movie players. The mobile terminal 100 includes an operation interface 112, a display 114, a Wi-Fi I/F 120, an NFC I/F 122, and a controller 130, each of which is connected to a bus.

The operation interface 112 includes a plurality of keys or buttons (physical and/or virtual) and can receive user operations. The operation interface 122 enables the user to provide various instructions to the mobile terminal 100. The display 114 is configured to display various information thereon. The display 114 also functions as a touch screen. That is, the display 114 also serves as an operation interface.

The operation interface 112 and the display 114 are an example of the claimed "user interface".

The Wi-Fi I/F 120 has a similar configuration to the Wi-Fi I/F 20 of the MFP 10. The Wi-Fi I/F 120 is a wireless interface for enabling the Wi-Fi communication, and particularly supports the WFD protocol. The mobile terminal 100 is configured to perform, using the Wi-Fi I/F 120, the Wi-Fi communication with the MFP 10 directly (without requiring the access point ACP) or via the access point ACP. The NFC I/F 122 has a similar configuration to the NFC I/F 22 of the MFP 10. It is assumed that, in the first illustrative embodiment, the NFC I/F 122 operates in the R/W mode. The Wi-Fi I/F 120 is an example of the claimed "second communication interface". The NFC I/F 122 is an example of the claimed "first communication interface".

The controller 130 includes a CPU 132 and a memory 134. The CPU 132 is configured to execute various processing in accordance with an operating system ("OS") program 136 stored in the memory 134. The memory 134 may include a volatile memory and a nonvolatile memory. The memory 34 is a non-transitory computer readable storage medium. The CPU 132 is an example of the claimed "processor".

The OS program 136 is a program for implementing basic operations of the mobile terminal 100. The OS program 136 may be, for example, iOS (iOS is a registered trademark owned by Cisco Technology, Inc. of San Jose, Calif.) program or an Android (Android is a trademark owned by Google Inc. of Mountain View, Calif.) OS program.

The memory 134 further stores an MFP application program 140 and history information used in an access point ("AP") designation process described later. The MFP application program 140 is a program for causing the MFP 10 to execute various functions. In one example, the MFP application program 140 may be installed on the mobile terminal 100 from a server provided on the Internet by a vendor of the MFP 10. In another example, the MFP application program 140 may be installed on the mobile terminal 100 from a medium packed and shipped with the MFP 10. The controller 130 is configured to execute the access point ("AP") designation process (refer to FIG. 2) in accordance with the MFP application program 140. The MFP application program 140 is an example of the claimed "computer-readable instructions".

Access Point

The access point ACP is a relay station for relaying wireless LAN communication between devices. The access point ACP is configured to establish a wireless connection with each of the MFP 10 and the mobile terminal 100 and relay wireless LAN communication performed between the MFP 10 and the mobile terminal 100.

1-2. AP Designation Process

Figure 2:
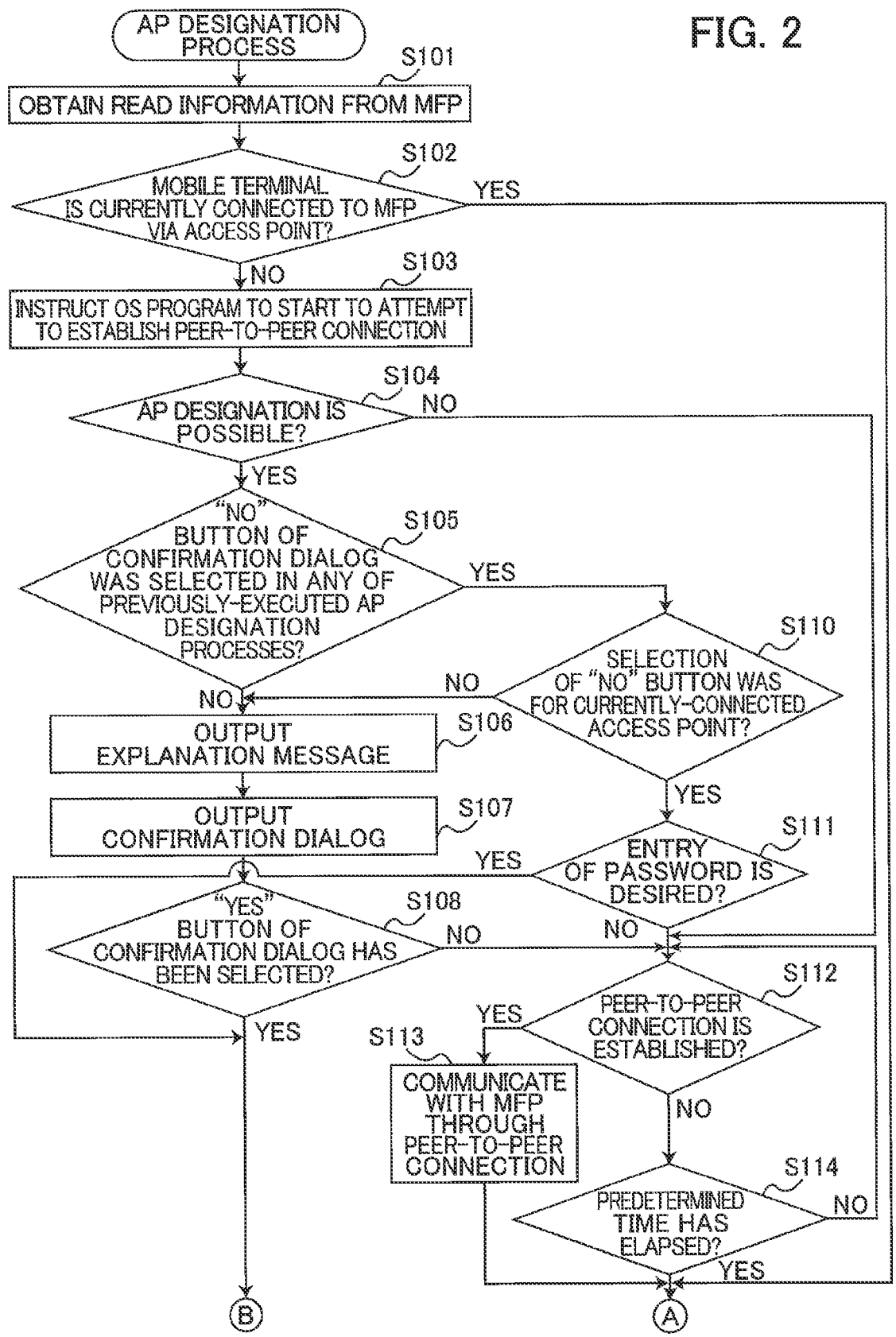
FIG. 2 is a flowchart of an AP designation process in a first illustrative embodiment according to one or more aspects of the disclosure.
Figure 3:
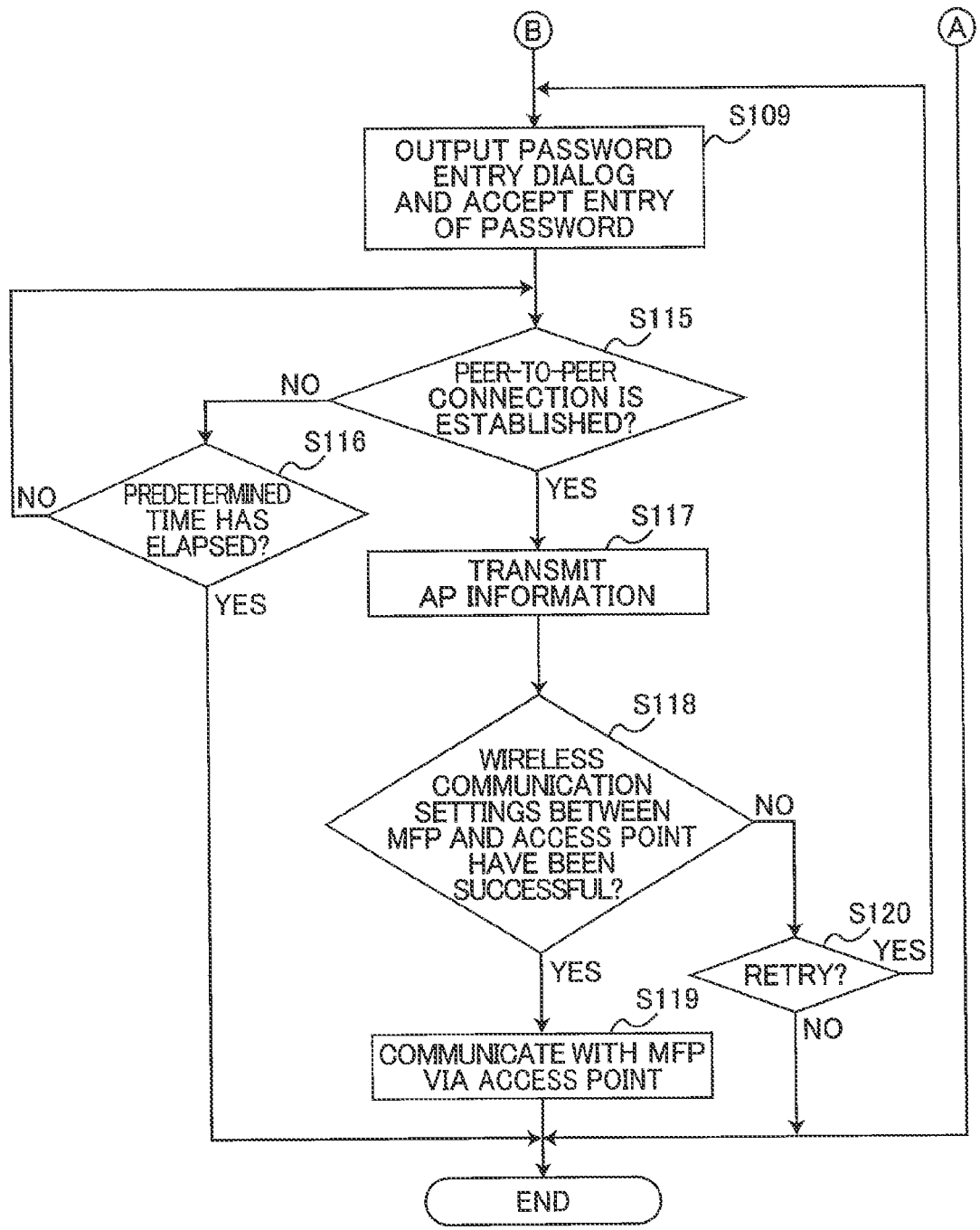
FIG. 3 is a continuation of the flowchart of FIG. 2 in the first illustrative embodiment according to one or more aspects of the disclosure.

Referring to FIGS. 2 and 3, the AP designation process executed by the controller 130 in accordance with the MFP application program 140 will be described. The AP designation process is for transmitting AP information including a password of an access point from the mobile terminal 100 to the MFP 10 and enabling the MFP 10 to establish a wireless connection with the access point ACP using the AP information. The password of the access point is required for the MFP 10 to establish a connection with the access point ACP. Note that, in the following description, actions of the CPU 132 according to the application program 140 may be sometimes described by expressions using the program name, such as "the application program 140 receives" and "the application program 140 determines". Similarly, actions of the CPU 132 according to the OS program 136 may be sometimes described by expressions using the program name, such as "the OS program 136 transmits" and "the OS program 136 obtains". The same holds true for the CPU 32 and the program 36.

The AP designation process starts in response to a user bringing the mobile terminal 100 close to the MFP 10 at a distance that allows NFC communication between the mobile terminal 100 and the MFP 10 or in response to the user bringing the mobile terminal 100 into contact with the MFP 10 (e.g., in response to an NFC Touch event) after the MFP application 140 is started on the mobile terminal 100.

Figure 4:
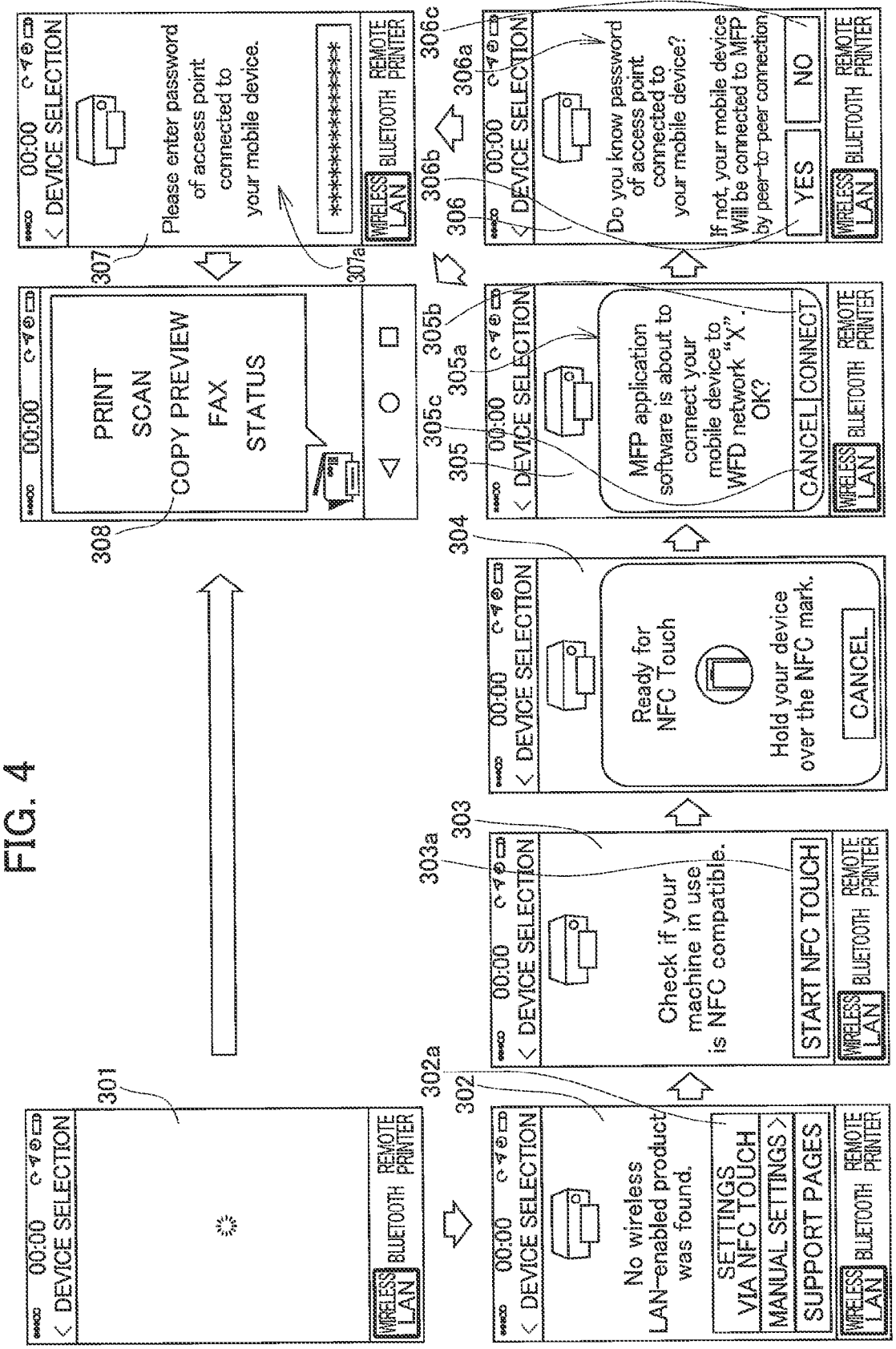
FIG. 4 is a screen flow diagram illustrating various screens to be displayed on a display of a mobile terminal in the AP designation process in the first illustrative embodiment according to one or more aspects of the disclosure.

More specifically, in response to the user starting the MFP application program 140, the MFP application program 140 displays a menu screen on the display 114. In response to the user selecting a "SELECT PRODUCT" menu on the menu screen, the controller 130 searches for one or more MFPs that have a function to establish a wireless LAN connection with the mobile terminal 100. As illustrated in FIG. 4, a screen 301 appears and stays on the display 114 while searching.

In response to completion of the searching, the screen 301 disappears and a screen 302 appears on the display 114. The screen 302 includes a virtual button 302a labeled "SETTING VIA NFC TOUCH" and a message. The message is, for example, "NO WIRELESS LAN-ENABLED PRODUCT WAS FOUND" or "A WIRELESS LAN-ENABLED PRODUCT WAS FOUND".

In response to the user selecting the virtual button 302a ("SETTING VIA NFC TOUCH"), the screen 302 disappears and a screen 303 appears on the display 114. The screen 303 includes a virtual button 303a labeled "START NFC TOUCH". In response to the user selecting the virtual button 303a ("START NFC TOUCH"), the screen 303 disappears and a screen 304 appears on the display 114. The screen 304 includes a message "READY FOR NFC TOUCH".

In response to the user bringing the mobile terminal 100 close to or into contact with the MFP 10 with the screen 304 displayed on the display 114, NFC communication starts between the mobile terminal 100 and the MFP 10 and thus the AP designation process starts. It is assumed that, in the first illustrative embodiment, the mobile terminal 100 is wirelessly connected with the access point ACP when the AP designation process starts and the MFP 10 operates in the G/O status temporarily in response to a user operation.

As the AP designation process starts, the controller 130 executes step S101 (refer to FIG. 2). It is assumed that, in the first illustrative embodiment, the NFC I/F 22 of the MFP 10 operates in the CE mode and the NFC I/F 122 of the mobile terminal 100 operates in the R/W mode.

Thus, in response to the start of the NFC communication, the mobile terminal 100 can transmit, to the MFP 10, a Read command in accordance with a Reader mode of the R/W mode and a Write command in accordance with a Writer mode of the RAY mode.

The Read command is for reading out information from the MFP, that is, requesting the MFP 10 to transmit Read information to the mobile terminal 100. The Write command is for writing information into the MFP 10, that is, requesting the MFP 10 to receive Write information from the mobile terminal 100.

In step S101, in response to the user bringing the mobile terminal 100 close to or into contact with the MFP 10 (i.e., in response to an NFC Touch event), the mobile terminal 100 starts NFC communication with the MFP 10. The OS program 136 transmits a Read command to the MFP 10. The MFP application program 140 receives, from the MFP 10 via the OS program 136, Read information as a response to the Read command. The Read information includes connection information and settings-completed AP information. The NFC communication performed between the mobile terminal 100 and the MFP 10 in S101 is an example of the claimed "specific communication".

The connection information is used for establishing a peer to peer connection between the mobile terminal 100 and the MFP 10 through Wi-Fi communication. In the first illustrative embodiment, the connection information is used for establishing a connection between the mobile terminal 100 and the MFP 10 through WFD communication. The connection information includes, for example, the MAC address "A" of the MFP 10, a Service Set Identifier ("SSID") for identifying a WFD network configured by the MFP 10, a password to be used for authentication and encryption in the WFD network. In the first illustrative embodiment, the MFP 10 operates as a group owner (G/O) in the WFD network. The connection information is an example of the claimed "second information" and also is an example of the claimed "fourth information". The peer to peer connection with the MFP 10 is an example of the claimed "specific wireless connection".

The settings-completed AP information is used for identifying the access point to which the MFP 10 is wirelessly connected, that is, the access point for which wireless connection settings have already been completed on the MFP 10. In the first illustrative embodiment, the settings-completed AP information includes an identifier (i.e., an SSID) for identifying the access point to which the MFP 10 is wirelessly connected.

In step S102, the controller 130 determines, based on the settings-completed AP information received in step S101, whether the mobile terminal 100 is currently connected to the MFP 10 via the access point to which the mobile terminal 100 is currently wirelessly connected. In other words, in step S102, the controller 130 determines, based on the settings-completed AP information received in step S101, whether a connection between the mobile terminal 100 and the MFP 10 via the access point to which the mobile terminal 100 is currently wirelessly connected has already been established.

More specifically, if the settings-completed AP information obtained in step S101 includes the SSID of the access point to which the mobile terminal 100 is currently wirelessly connected, the controller 130 determines that the mobile terminal 100 is currently connected to the MFP 10 via the access point. If the settings-completed AP information does not include the SSID of the access point to which the mobile terminal 100 is currently wirelessly connected, the controller 130 determines that the mobile terminal 100 is not currently connected to the MFP 10 via the access point.

It is assumed that, in the first illustrative embodiment, the mobile terminal 100 has been wirelessly connected to the access point ACP. In step S102, the controller 130 thus determines whether the mobile terminal 100 is currently connected to the MFP 10 via the access point ACP.

If the controller 130 determines that the mobile terminal 100 is currently connected to the MFP 10 via the access point (YES in step S102), the controller 130 ends the AP designation process (refer to FIGS. 2 and 3). If the controller 130 determines that the mobile terminal 100 is not currently connected to the MFP 10 via the access point (NO in step S102), the routine proceeds to step S103.

In step S103, the controller 130 instructs the OS program 136 to attempt to establish a peer to peer connection between the mobile terminal 100 and the MFP 10. In response to the execution of step S103, as illustrated in FIG. 4, the OS program 136 displays a screen 305 on the display 114. The screen 305 includes a connection permission dialog 305a inquiring of the user, for example, whether the user permits establishment of a peer to peer connection between the mobile terminal 100 and the MFP 10 through Wi-Fi communication. The peer to peer connection between the mobile terminal 100 and the MFP 10 is an example of the claimed "one-to-one wireless connection".

The connection permission dialog 305a includes a virtual button 305b labeled "CONNECT" and a virtual button 305c labeled "CANCEL". The virtual button 305b ("CONNECT") enables the user to indicate that the user permits the establishment of the peer to peer connection. The virtual button 305c ("CANCEL") enables the user to indicate that the user rejects the establishment of the peer to peer connection.

In response to the user selecting the virtual button 305b ("CONNECT"), the OS program 136 attempts to establish, using the connection information included in the Read information received in step S101, a peer to peer connection between the mobile terminal 100 and the MFP 10. More specifically, in the first illustrative embodiment, the OS program 136 attempts to establish, using the MAC address "A" of the MFP 10 included in the connection information, a peer to peer connection through Wi-Fi communication (more specifically, WFD communication). If the peer to peer connection is established between the mobile terminal 100 and the MFP 10, the MFP 10 (i.e., the WFD-enabled device) participates, as a client according to the WFD protocol, in the WFD network in which the MFP 10 operates as the G/O.

In response to the user selecting the virtual button 305c ("CANCEL"), the controller 130 ends the AP designation process (refer to FIGS. 2 and 3).

Subsequent to step S103, in step S104, the controller 130 determines whether access point ("AP") designation for the MFP 10 is possible. The AP designation denotes wirelessly connecting the MFP 10 to a particular access point. If the mobile terminal 100 is already wirelessly connected to a particular access point (e.g., if there is an access point to which the MFP 10 can be connected), the controller 130 determines that the AP designation is possible. If the mobile terminal 100 has not been wirelessly connected to any access point (e.g., if there is no access point to which the MFP 10 can be connected), the controller 130 determines that the AP designation is not possible.

In some cases, nevertheless, the AP designation for the MFP 10 might not be allowed just by obtaining user's permission. In this case, a particular virtual button may be displayed on the display 114. The particular virtual button enables the user to provide an instruction to skip displaying of an explanation message (step S106) and a confirmation dialog 306a (step S107) in the next and subsequent AP designation processes. For example, the particular virtual button may be included in a screen 306 (refer to FIG. 4). If the user selects the particular virtual button, the routine may skip steps S106 to S109 in the next and subsequent AP designation processes.

If, in step S104, the controller 130 determines that the AP designation for the MFP 10 is possible (YES in step S104), the routine proceeds to step S105.

In the first illustrative embodiment, although described in detail later, the controller 130 displays the confirmation dialog 306a (refer to S107 depicted in FIG. 4) on the display 114. The confirmation dialog 306a inquires of the user whether the user knows the password of the connection-target access point. More specifically, in the first embodiment, the connection-target access point is the access point to which the mobile terminal 100 is currently connected and to which the MFP 10 is caused to be connected (also sometimes referred to as the currently-connected AP).

The confirmation dialog 306a includes a virtual button 306b labeled "YES" and a virtual button 306c labeled "NO". The virtual button 306b ("YES") enables the user to indicate that the user knows the password of the connection-target access point (in the first illustrative embodiment, the password of the currently-connected AP). The virtual button 306c ("NO") enables the user to indicate that the user does not know the password of the connection-target access point. The confirmation dialog 306a is an example of the claimed "second screen" and also is an example of the claimed "third screen".

In step S105, the controller 130 determines, based on a determination-completed AP list included in the history information stored in the memory 134, whether the virtual button 306c ("NO") was selected before for any of one or more available access points. If the controller 130 determines that the Here, the history information, the determination-completed AP list, and the determination in step S105 are described in detail. The history information is information collected based on user operations made to the operation interface 112 or the display 114 during execution of the AP designation process. The determination-completed AP list is a list for recording one or more access points whose password is already determined to be unknown to the user. In the AP designation process, when the virtual button 306c ("NO") on the confirmation dialog 306a is selected, the controller 130 determines that the user does not know the password of an access point which is connected to the mobile terminal 100 as of the selection of the virtual button 306c ("NO"). Based on this determination, the controller 130 records, in the determination-completed AP list, the SSID of the access point determined to be unknown to the user. Thus, the access point identified by an SSID recorded in the determination-completed AP list is considered an access point whose password is already determined to be unknown to the user.

Further, accordingly, if the user selects the virtual button 306c ("NO") on the confirmation dialog 306a in a preceding AP designation process, at least one SSID is recorded in the determination-completed AP list as of the execution of a subsequent AP designation. Therefore, in order to determine whether the virtual button 306c ("NO") was selected before for any of one or more available access points, the controller 130 determines whether at least one SSID is recorded in the determination-completed AP list (in other words, whether at least one SSID is stored as the history information in the memory 134). If the controller 130 determines that at least one SSID is recorded in the determination-completed AP list (i.e., at least one SSID is stored as the history information in the memory 134), the controller 130 determines that the virtual button 306c ("NO") was selected before. If the controller 130 determines that no SSID is recorded in the determination-completed AP list (i.e., no SSID is stored as the history information in the memory 134), the controller 130 determines that the virtual button 306c ("NO") was never selected before. The determination-completed AP list is an example of the claimed "third information".

If, in step S105, the controller 130 determines that the virtual button 306c ("NO") was never selected before for any of one or more access points (NO in step S105), the routine proceeds to step S106.

In step S106, the controller 130 displays an explanation message on the display 114. The explanation message indicates, for example, that it is possible to connect the MFP 10 to a particular access point and it will be convenient if the MFP 10 is connected to the particular access point. More specifically, for example, the explanation message indicates that once the AP designation for the MFP 10 is performed, Wi-Fi communication between the mobile terminal 100 and the MFP 10 via the particular access point becomes automatically available from the next every time the mobile terminal 100 enters an area within which the mobile terminal 100 can perform Wi-Fi communication with the MFP 10.

In step S107, the controller 130 displays, on the display 114, the screen 306 (refer to FIG. 4) including the confirmation dialog 306a.

In step S108, the controller 130 determines whether the virtual button 306b ("YES") on the confirmation dialog 306a has been selected for the connection-target access point (i.e., for the access point to which the mobile terminal 100 is currently connected).

If, in step S108, the controller 130 determines that the virtual button 306b ("YES") on the confirmation dialog 306a has been selected for the connection-target access point (YES in step S108), the routine proceeds to step S109.

In step S109, the controller 130 displays, on the display 114, a screen 307 (refer to FIG. 4) including a password entry dialog 307a. The password entry dialog 307a enables the user to enter the password of the connection-target access point (in the first embodiment, the currently-connected AP). In one example, the password entry dialog 307a may be designed to enable the user to manually enter the password. In another example, the password entry dialog 307a may be designed to enable the user to enter the password using a QR Code (QR Code is a registered trademark owned by DENSO WAVE INCORPORATED of Aichi, Japan) indicating the password. Subsequent to step S109, the controller 130 proceeds to step S115. Note that, the process performed in step S109 can be considered a process of setting a user interface (such as the display 114 and the operation interface 112) to an allowing state in which the user interface allows the password to be entered. The password entry dialog 307a is an example of the claimed "first screen" and also is an example of the claimed "sixth screen".

If, in step S105, the controller 130 determines that the virtual button 306c ("NO") was selected before for any of the one or more available access points (YES in step S105), the routine proceeds to step S110.

In step S110, the controller 130 determines whether the virtual button 306c ("NO") was selected before for the access point to which the mobile terminal 100 is currently connected.

More specifically, in order to determine whether the virtual button 306c ("NO") was selected before for the currently-connected AP, the controller 130 determines whether one or more access points identified by one or more SSIDs recorded in the determination-completed AP list includes the currently-connected AP (i.e., whether the currently-connected AP is already recorded in the determination-completed AP list). When determining that one or more access points identified by one or more SSIDs recorded in the determination-completed AP list includes the currently-connected AP, the controller 130 determines that the virtual button 306c ("NO") was selected before for the currently-connected AP. On the other hand, when determining that one or more access points identified by one or more SSIDs recorded in the determination-completed AP list does not include the currently-connected AP, the controller 130 determines that the virtual button 306c ("NO") was never selected before for the currently-connected AP.

If, in step S110, the controller 130 determines that the virtual button 306c ("NO") was selected before for the access point to which the mobile terminal 100 is currently connected (YES in step S110), the controller 130 determines not to display the confirmation dialog 306a and proceeds to step S111.

In step S111, the controller 130 determines whether an event indicating that the user desires to enter the password has occurred. For example, a predetermined screen displayed after the MFP application program 140 starts may include a virtual button for enabling the user to manually enter the password of the connection-target access point. The predetermined screen may be a menu screen to be displayed on the display 114 by the MFP application program 140 after the MFP application program 140 starts. The predetermined screen may include such a virtual button if the virtual button 306c ("NO") was selected before for the access point to which the mobile terminal 100 is currently connected. The user operation of selecting the virtual button on the predetermined screen is an example of the claimed "particular user operation".

If the AP designation process starts after the user selects the virtual button on the predetermined screen, the controller 130 determines, in step S111, that an event indicating that the user desires to enter the password has occurred. In a case where the user selects the virtual button on the predetermined screen, as is the case with the user selecting the "SELECT PRODUCT" menu, a message "READY FOR NFC TOUCH" appears on the display 114. In response to the user bringing the mobile terminal 100 close to or into contact with the MFP 10 with the display 114 displaying such a message, NFC communication starts between the mobile terminal 100 and the MFP 10 and thus the AP designation process starts.

If the AP designation process starts without the user selecting the virtual button on the predetermined screen, the controller 130 determines, in step S111, that the event indicating that the user desires to enter the password has not occurred.

If, in step S111, the controller 130 determines that the event indicating that the user desires to enter the password has not occurred (NO in step S111), the routine proceeds to step S112.

If, in step S108, the controller 130 determines that the virtual button 306b ("YES") has not been selected for the access point to which the mobile terminal 100 is currently connected, that is, the virtual button 306c ("NO") has been selected for the access point to which the mobile terminal 100 is currently connected (NO in step S108), the controller 130 records, in the determination-completed AP list, the SSID of the currently-connected AP, that is, the controller 130 stores the S SID of the currently-connected AP in the memory 134 as the history information. Thereafter, the routine proceeds to step S112.

If, in step S104, the controller 130 determines that the AP designation for the MFP 10 is not possible (NO in step S104), the routine also proceeds to step S112.

In step S112, the controller 130 determines, based on a signal received from the OS program 136, whether a peer to peer connection based on the instruction issued in step S103 has been established. More specifically, for example, the controller 130 receives information from the OS program 136. The information includes, for example, the results of the determination as to whether the virtual button 305*b* ("CONNECT") has been selected. If the virtual button 305*b* ("CONNECT") has been selected, the information further includes the results of the determination as to whether an attempt to establish a peer to peer connection with the MFP 10 has succeeded. The controller 130 then determines, based on such information, whether the peer to peer connection between the mobile terminal 100 and the MFP 10 has been established.

If, in step S112, the controller 130 determines that the peer to peer connection between the mobile terminal 100 and the MFP 10 has been established (YES in step S112), the routine proceeds to step S113. In step S113, the controller 130 causes the mobile terminal 100 to communicate directly with the MFP 10 through the peer to peer connection (i.e., communicate with the MFP 10 through the peer to peer connection without intervention of any access point). In other words, the mobile terminal 100 performs Wi-Fi communication directly with the MFP 10 not via any access point. In the first illustrative embodiment, the Wi-Fi communication directly with the MFP 10 not via any access point is WFD communication with the MFP 10. For example, the mobile terminal 100 and the MFP 10 exchange their capability information. Then, the controller 130 displays a screen 308 (refer to FIG. 4) on the display 114. The screen 308 shows, for example, tasks that the MFP 10 can perform. Thereafter, the controller 130 ends the AP designation process (refer to FIGS. 2 and 3).

If, in step S112, the controller 130 determines that the peer to peer connection between the mobile terminal 100 and the MFP 10 has not been established (NO in step S112), the routine proceeds to step S114. In step S114, the controller 130 determines whether a predetermined period of time has elapsed since the controller 130 executed step S103 (i.e., since the controller 130 provided the OS program 136 with the instruction to attempt to establish a peer to peer connection).

If the controller 130 determines that the predetermined period of time has not elapsed (NO in step S114), the routine returns to step S112. If the controller 130 determines that the predetermined period of time has elapsed (YES in step S114), the controller 130 ends the AP designation (refer to FIGS. 2 and 3).

That is, in a case where the user selects the virtual button 306*c* ("NO") for the access point to which the mobile terminal 100 is currently connected (NO in step S108), in response to a peer to peer connection between the mobile terminal 100 and the MFP 10 being established (YES in step S112), the mobile terminal 100 communicates directly with the MFP 10 through the peer to peer connection without intervention of any access point. In particular, in a case where the virtual button 306*c* ("NO") was selected before for the access point to which the mobile terminal 100 is currently connected (YES in step S110) and the event indicating that the user desires to enter the password has not occurred (NO in step S110), the confirmation dialog 306*a* and the password entry dialog 307*a* are not displayed.

If, in step S110, the controller 130 determines that the virtual button 306*c* ("NO") was not selected before for the access point to which the mobile terminal 100 is currently connected (NO in step S110), the routine proceeds to step S106.

That is, even in a case where the virtual button 306*c* ("NO") was selected before for a particular access point (NO in step S108) in a previous AP designation process, if the mobile terminal 100 is currently connected to another access point for which the virtual button 306*c* ("NO") was not selected before, the controller 130 makes a negative determination ("NO") in step S110 and thus the confirmation dialog 306*a* and the password entry dialog 307*a* are displayed on the display 114.

If, in the step S111, the controller 130 determines that the event indicating that the user desires to enter the password has occurred (YES in step S111), the routine proceeds to step S109. That is, even in a case where the virtual button 306*c* ("NO") was selected before for the access point to which the mobile terminal 100 is currently connected (YES in step S110), the password entry dialog 307*a* is displayed on the display 14 if the event indicating that the user desires to enter the password has occurred.

In response to accepting an entry of the password of the access point in step S109, the routine proceeds to step S115. In step S115, similar to step S112, the controller 18 determines whether a peer to peer connection between the mobile terminal 100 and the MFP 10 has been established.

If, in step S115, the controller 130 determines that a peer to peer connection between the mobile terminal 100 and the MFP 10 has not been established (NO in step S115), the routine proceeds to step S116. In step S116, similar to step S114, the controller 130 determines whether a predetermined period of time has elapsed since the controller 130 executed step S103 (i.e., since the controller 130 provided the OS program 136 with the instruction to establish a peer to peer connection).

If the controller 130 determines that the predetermined period of time has not elapsed (NO in step S116), the routine returns to step S115. If the controller 130 determines that the predetermined period of time has elapsed (YES in step S116), the controller 130 ends the AP designation process (FIGS. 2 and 3).

If, in step S115, the controller 130 determines that a peer to peer connection between the mobile terminal 100 and the MFP 10 has been established (YES in step S115), the routine proceeds to step S117. In step S117, the controller 130 transmits AP information to the MFP 10 through the peer to peer connection. In other words, in step S117, the controller 130 performs Wi-Fi communication directly with the MFP 10 (in the first embodiment, WFD communication with the MFP 10) to transmit AP information thereto. The AP information is an example of the claimed "first information" and also is an example of the claimed "specific information".

The AP information includes various information necessary for wirelessly connecting the MFP 10 to the connection-target access point (i.e., the access point to which the mobile terminal 100 is currently connected). In the first illustrative embodiment, the AP information includes the password and SSID of the connection-target access point. In step S117, the controller 130 transmits, to the MFP 10, the AP information about the connection-target access point (in the first embodiment, the access point ACP to which the mobile terminal 100 is currently connected).

The mobile terminal 100 obtains, through wireless communication with the connection-target access point, the SSID and password of the access point to which the mobile terminal 100 is currently connected. The mobile terminal 100 then stores the obtained SSID and password in the memory 134 at an appropriate timing. In step S117, the controller 130 transmits, to the MFP 10, the SSID stored in the memory 134. However, the OS program 136 might not allow transmission of the password of the connection-target access point to the mobile terminal 100 through wireless communication for security reasons. Thus, the mobile terminal 100 obtains the password of the connection-target access point by a user entry in step S109 and transmit the obtained password to the MFP 10 in step S117.

In step S118, the controller 130 determines whether a wireless connection between the MFP 10 and the connection-target access point has been established (i.e., whether wireless communication settings for the access point has been successful on the MFP 10). The MFP 10 is configured to, in response to receipt of AP information from the mobile terminal 100, attempt to establish a connection with the access point indicated by the AP information.

More specifically, the MFP 10 is configured to determine whether the AP information has been received from the mobile terminal 100. When determining that the AP information has been received from the mobile terminal 100, the mobile terminal 100 attempts to establish a connection with the access point indicated by the received AP information. Further, the MFP 10 transmits, to the mobile terminal 100, AP designation results indicating the determination results as to whether the establishment of a wireless connection with the connection-target access point has succeeded. On the other hands, when determining the AP information has not been received from the mobile terminal 100, in step S113 the MFP 10 performs Wi-Fi communication directly with the mobile terminal 100 without intervention of the access point, as described above.

The controller 130 then determines, based on the AP designation results transmitted from the MFP 10, whether a wireless connection between the MFP 10 and the connection-target access point has been established (i.e., whether wireless communication settings for the access point has been successful on the MFP 10).

If, in step S118, the controller 130 determines that a wireless connection between the MFP 10 and the connection-target access point has been established (YES in step S118), the routine proceeds to step S119. In step S119, the controller 130 causes the mobile terminal 100 to communicate with the MFP 10 via the connection-target access point. In other words, the mobile terminal 100 performs Wi-Fi communication with the MFP 10 via the connection-target access point. If the SSID of the connection-target access point to which the MFP 10 is wirelessly connected in the current AP designation process is stored as the history information in the memory 134, the controller 130 deletes the stored SSID of the connection-target access point from the memory 134.

In step S119, for example, the mobile terminal 100 and the MFP 10 exchange their capability information. Then, the controller 130 displays the screen 308 (refer to FIG. 4) on the display 114. The screen 308 shows, for example, tasks that the MFP 10 can perform. Thereafter, the controller 130 ends the AP designation process (refer to FIGS. 2 and 3).

If, in step S118, the controller 130 determines that a wireless connection between the MFP 10 and the connection-target access point has not been established (NO in step S118), the routine proceeds to step S120. In step S120, the controller 130 displays, on the display 114, a dialog (not illustrated) inquiring of the user whether the user requests a retry for the establishment of a wireless connection between the MFP 10 and the connection-target access point. The controller 130 then determines, based on a user operation to the dialog, whether the establishment of a wireless connection between the MFP 10 and the connection-target access point needs to be retried.

If, in step S120, the controller 130 determines that the user operation corresponds to a retry request, that is, the user operation indicates execution of a retry for the establishment of a wireless connection (YES in step S120), the routine returns to step S109 to display the password entry dialog 307a for accepting entry of the password of the connection-target access point from the user.

If, in step S120, the controller 130 determines that the user operation corresponds to a cancel request, that is, the user operation indicates non-execution of a retry for the establishment of a wireless connection (NO in step S120), the controller 130 ends the AP designation process (refer to FIGS. 2 and 3).

1-3. Specific Example Case

Figure 5:
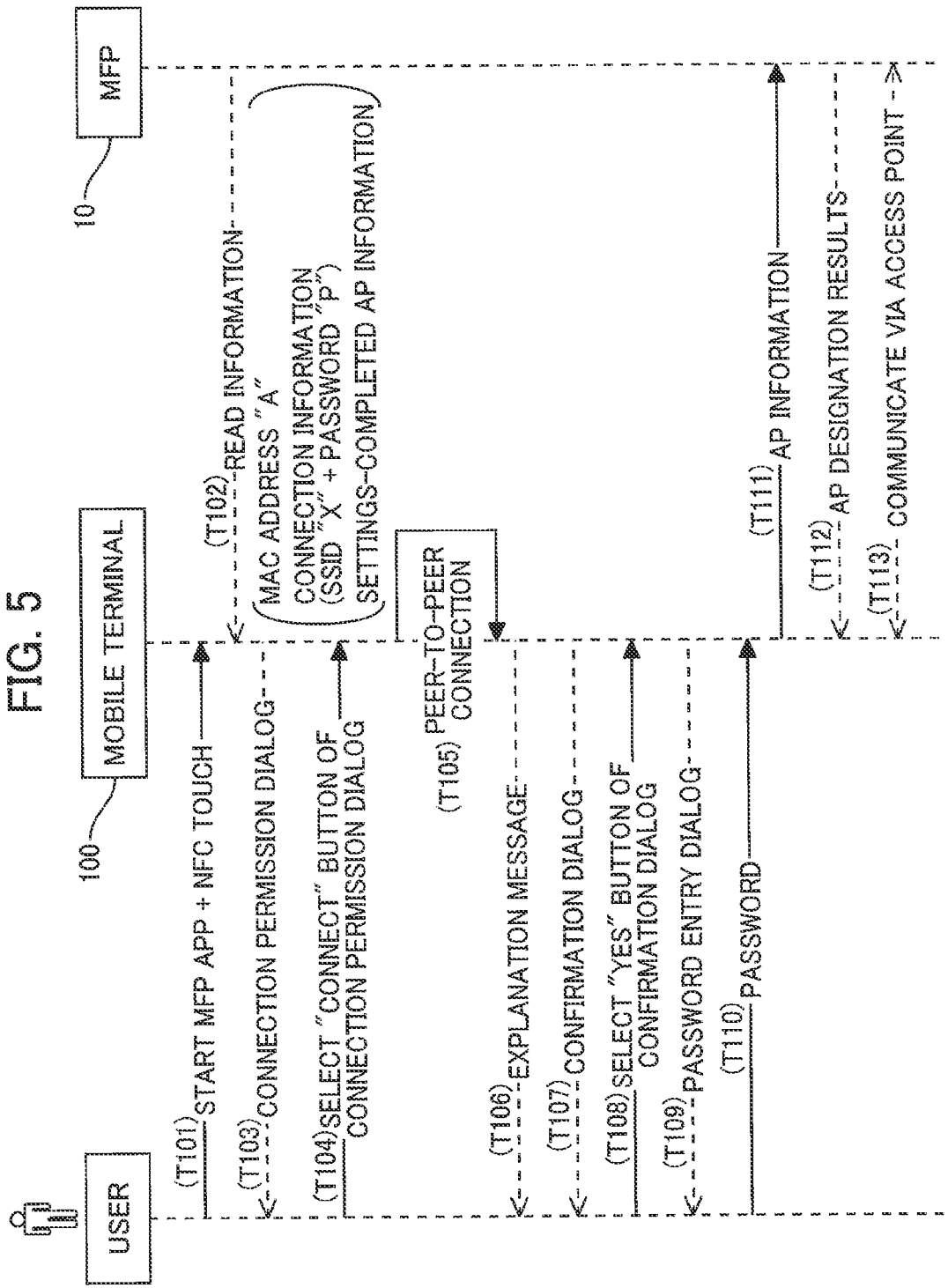
FIG. 5 is a sequence diagram illustrating communication performed between the mobile terminal and a communication device in a specific example case when the AP designation process is executed in the first illustrative embodiment according to one or more aspects of the disclosure.

Referring to FIG. 5, a specific example case implemented in the AP designation process (refer to FIGS. 2 and 3) will be described.

In step T101, a user starts the MFP application program 140 via the operation interface 112 of the mobile terminal 100 and selects the virtual button 303a ("START NFC TOUCH") (refer to FIG. 4) on the display 114. The user then brings the mobile terminal 100 near or into contact with the MFP 10 (i.e., performs NFC Touch).

In response to the mobile terminal 100 being located close to or into contact with the MFP 10, an NFC connection is established between the MFP 10 and the mobile terminal 100. The OS program 136 then transmits a Read command to the MFP 10 through NFC communication. In response to the Read command, in step T102, the mobile terminal 100 receives Read information from the MFP 10. The Read information includes connection information and settings-completed AP information.

In this example case, the connection information includes the MAC address "A" of the MFP 10, and an SSID "X" and a password "P" of a WFD network in which the MFP 10 operates as the G/O. Further, in this example case, the settings-completed AP information indicates that the mobile terminal 100 is not currently connected to the MFP 10 via the access point to which the mobile terminal 100 is currently wirelessly connected (NO in step S102). In step T103, the connection permission dialog 305a (refer to FIG. 4) thus appears on the display 114 of the mobile terminal 100. In step T104, the user selects the virtual button 305b ("CONNECT") on the connection permission dialog 305a.

In step T105, the mobile terminal 100 starts to attempt to establish a peer to peer connection with the MFP 10 through Wi-Fi communication. In this example case, the AP designation for the MFP 10 is possible (YES in step S104) and the virtual button 306c ("NO") was not selected before for any of one or more available access points (NO in step S105). In step T106, thus, the explanation message indicating that connecting the MFP 10 to the access point ACP is possible, is displayed on the display 114. In step T107, the confirmation dialog 306a appears on the display 114. In step T108, the user selects, on the confirmation dialog 306a, the virtual button 306b ("YES") to indicate that the user knows the password of the access point ACP (i.e., the password of the connection-target access point).

In step T109, the password entry dialog 307a appears on the display 114. In step T110, the user enters the password of the access point ACP on the password entry dialog 307a. In this example case, before the user enters the password of the access point, the mobile terminal 100 finishes obtaining the SSID and password of the access point ACP through wireless communication with the access point ACP and storing the obtained SSID and password in the memory 134. In this example case, a peer to peer connection between the mobile terminal 10 and the MFP 100 is established at this moment (YES in step S115).

Thus, in step T111, the mobile terminal 100 transmits AP information to the MFP 10 through the peer to peer connection. In this example case, the AP information includes the password of the access point ACP entered by the user in step T110 and the SSID of the access point ACP stored in the memory 134.

Then, the MFP 10 performs wireless communication settings for the access point ACP using the AP information. In step T112, the MFP 10 transmits, to the mobile terminal 100, an AP designation result indicating that the wireless communication settings for the access point ACP and the MFP 10 have been successful. In step T113, the mobile terminal 100 and the MFP 10 thus communicate with each other via the access point ACP. In other words, the mobile terminal 100 performs Wi-Fi communication with the MFP 10 via the access point ACP.

1-4. Effects

According to the first illustrative embodiment, the following effects may be achieved. If the mobile terminal 100 does not receive the password of the access point ACP from the user, in response to the mobile terminal 100 performing NFC communication with the MFP 10, the controller 130 causes the mobile terminal 100 to communicate directly (i.e., without relay by any access point) with the MFP 10 using the peer to peer connection established through Wi-Fi communication, that is, the mobile terminal 100 performs Wi-Fi communication directly with the MFP 10 (more specifically, performs WFD communication with the MFP 10).

More specifically, in the first illustrative embodiment, the mobile terminal 100 (the controller 130) determines, by executing a process of steps S102, S104, S105, S107, S108, S110, and S111, whether to display the password entry dialog 307a on the display 114 (i.e., whether the password entry dialog 307a should be displayed on the display 114). In other words, the mobile terminal 100 determines whether to set a user interface (such as, the operation interface 112 and the display 114) to an allowing state in which the user interface allows the password to be entered. When determining to display the password entry dialog 307a on the display 114 (S108: Yes or S111: Yes), the mobile terminal 100 displays the password entry dialog 307a and receives the password therethrough, and then transmits the password to the MFP 10. On the other hand, when determining not to display the password entry dialog 307a on the display 114 (S108: No or S111: No), the mobile terminal 100 performs Wi-Fi communication directly with the MFP 10 without displaying the password entry dialog 307a.

Such a configuration does not require any user operation for resolving the problem that the user cannot entry the password of the access point ACP, thereby increasing user friendliness.

In general, the mobile terminal 100 is configured to, after the mobile terminal 100 is connected to a particular access point once, automatically connect to the same access point again. For example, even after the mobile terminal 100 moves out of a coverage area (i.e., an area within which radio waves of the access point reach), the mobile terminal 100 is automatically connected again to the access point in response to entering the coverage area again. Thus, even when the mobile terminal 100 moves out of the coverage area after the mobile terminal 100 and the MFP 10 are connected to the same access point ACP once, the mobile terminal 100 wirelessly connects to the MFP 10 again via the access point ACP automatically in response to entering the coverage area. Such a configuration thus enables the mobile terminal 100 to wirelessly connect to the MFP 10 again without requiring any user operation such as an NFC Touch and some subsequent operations (e.g., the user operations performed on the screens 302 to 307 in FIG. 4) when the mobile terminal 100 enters the coverage area. In such a case, the screen 308 may appear immediately following the screen 301 (refer to FIG. 4). In other words, displaying of the screens 302 to 307 may be skipped. Accordingly, connecting the mobile terminal 100 and the MFP 10 to the same access point (e.g., the access point ACP) once can reduce some user operation steps for wirelessly connecting the mobile terminal 100 to the MFP 10 from the next time.

In the first illustrative embodiment, the controller 130 determines, based on the user operation via the confirmation dialog 306a, whether the user knows the password of the connection-target access point. Such a configuration thus enables the mobile terminal 100 to obtain accurate determination results as to whether the use knows the password of the connection-target access point (e.g., the access point ACP).

In the first illustrative embodiment, if the controller 130 determines that the virtual button 306b ("YES") has been selected, the controller 130 displays the password entry dialog 307a on the display 114. Such a configuration can thus avoid needless displaying of the password entry dialog 307a if the user does not know the password.

In the first illustrative embodiment, if the virtual button 306c ("NO") was selected before for the connection-target access point, i.e., the access point to which the mobile terminal 100 is currently connected (YES in step S110), steps S106 to S108 are skipped (refer to FIG. 2). That is, the controller 130 prohibits automatic displaying of the confirmation dialog 306a if the controller 130 determines that the user does not know the password of the access point to which the mobile terminal 100 is currently connected. If the controller 130 determines that the access point to which the mobile terminal 100 is currently connected is different from the access point to which the mobile terminal 100 was previously connected, the controller 130 executes step S107 again to display the confirmation dialog 306a inquiring of the user whether the user knows the password of the access point to which the mobile terminal 100 is currently connected.

Such a configuration can thus avoid repeat inquiry of the user whether the user knows the password of the connection-target access point (e.g., the access point ACP), which may bother the user, after the user once indicates that the user does not know the password of the connection-target access point via the confirmation dialog 306a. Further, such a configuration enables the mobile terminal 100 to inquire of the user whether the user knows the password of the access point to which the mobile terminal 100 is currently connected if the currently-connected AP is different from the previously-connected access point.

In the first illustrative embodiment, even when the controller 130 determines to prohibit automatic displaying of the confirmation dialog 306a (Yes in step S110), the controller 130 displays the password entry dialog 307a if the controller 130 determines in step S111 that the event indicating that the user desires to enter the password of the connection-target access point has occurred. That is, such a particular user operation triggers displaying of the password entry dialog 307a.

Consequently, according to the first illustrative embodiment, even if the access point to which the mobile terminal 100 is currently connected is the same as the previously-connected access point after the controller 130 once prohibits automatic displaying of the confirmation dialog 306a, the user can enter the password of the currently-connected AP at an appropriate timing after the user obtains the password. That is, such a configuration can avoid needless displaying of the password entry dialog 307a and enables the MFP 100 to be connected to the connection-target access point when the user desires so.

In the first illustrative embodiment, if the controller 130 determines that the mobile terminal 100 is not currently connected to the MFP 10 via the access point to which the mobile terminal 100 is currently wirelessly connected (NO in step S102), the controller 130 displays the password entry dialog 307a. If the controller 130 determines that the mobile terminal 100 is currently connected to the MFP 10 via the access point to which the mobile terminal 100 is currently wirelessly connected (YES in step S102), the controller 130 does not display the password entry dialog 307a.

That is, such a configuration can allow displaying of the password entry dialog 307a if settlement of the wireless communication settings for the MFP 10 is significant.

In the first illustrative embodiment, before accepting the entry of the password of the access point in step S109, the controller 130 instructs the OS program 136 to attempt to establish a peer to peer connection between the mobile terminal 100 and the MFP 10 (hereinafter, referred to as the "connecting process") in step S103. That is, the connecting process and the process for displaying the password entry dialog 307a, both of which may take time, are executed in parallel.

The parallel execution of such processes can thus achieve higher speed execution of the AP designation for the MFP 10 as compared with a configuration in which the controller 130 instructs, after accepting the entry of the password of the connection-target access point, the OS program 136 to attempt to establish a peer to peer connection between the mobile terminal 100 and the MFP 10.

In the first illustrative embodiment, the controller 130 establishes a peer to peer connection with the MFP 10 based on the connection information received from the MFP 10. This configuration can thus reduce the time and effort required for the user to perform the wireless communication settings for the MFP 10 as compared with a configuration that requires the user to manually enter the connection information (e.g., an SSID and password) of the MFP 10.

2. Second Illustrative Embodiment

2-1. Differences Between First Illustrative Embodiment and Second Illustrative Embodiment Hereinafter, a second illustrative embodiment will be described mainly with different points from the first illustrative embodiment, wherein process steps and elements identical to those in the first illustrative embodiment will be designated with the same step numbers to avoid duplicating description.

In the first illustrative embodiment, the user performs NFC Touch to cause the MFP 10 to be wirelessly connected to the connection-target access point (e.g., the access point ACP), and the NFC Touch triggers the start of the AP designation process. In a second illustrative embodiment, the user performs NFC Touch to cause the MFP 10 to perform a specific task, and the NFC Touch triggers the start of the AP designation process. In the second illustrative embodiment, the wireless communication settings for the MFP 10 and the connection-target access point (e.g., the access point ACP) are performed after the MFP 10 executes a specific task in the AP designation process, which differs from the configuration according to the first illustrative embodiment.

2-2. AP Designation Process

Figure 6:
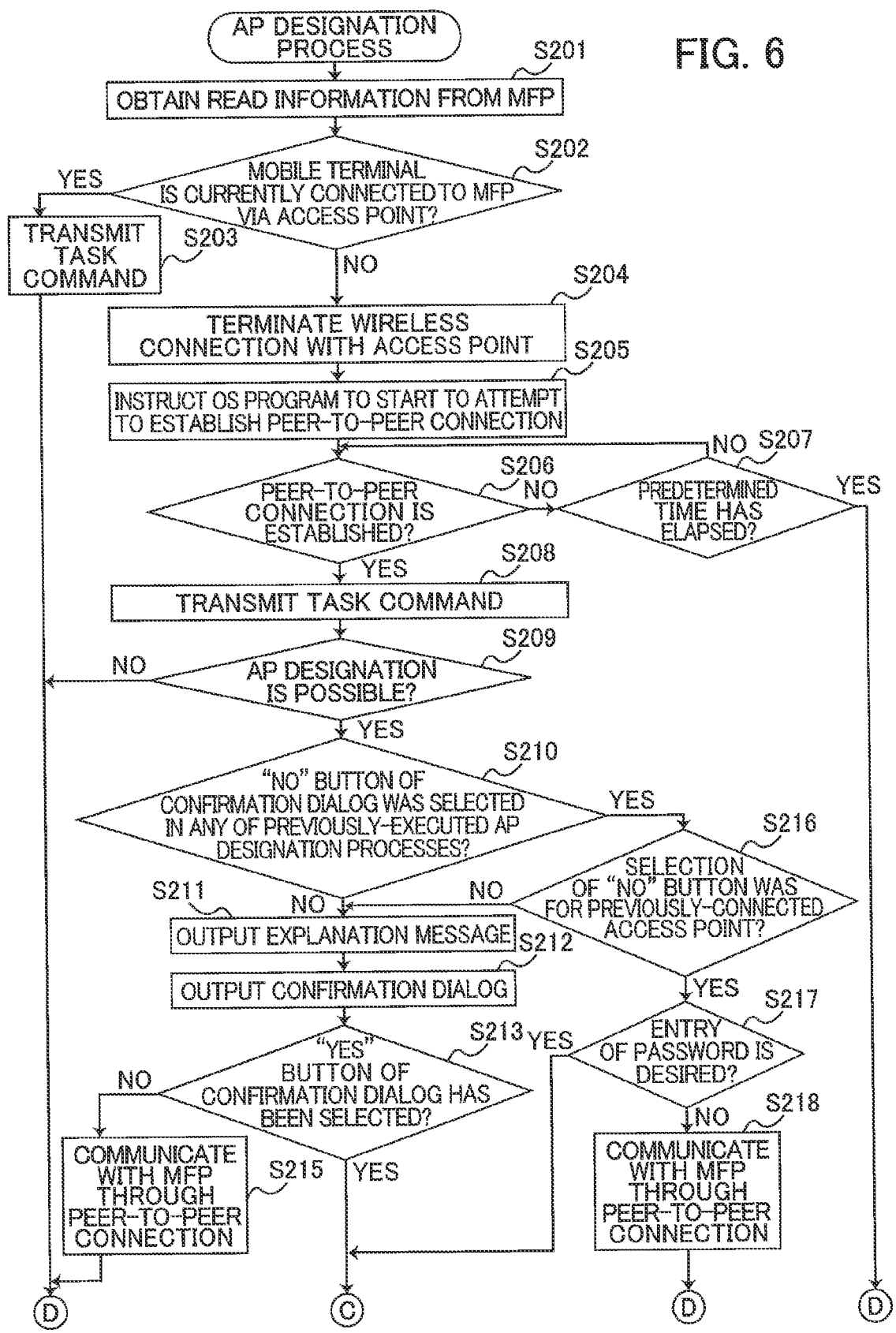
FIG. 6 is a flowchart of an AP designation process in a second illustrative embodiment according to one or more aspects of the disclosure.
Figure 7:
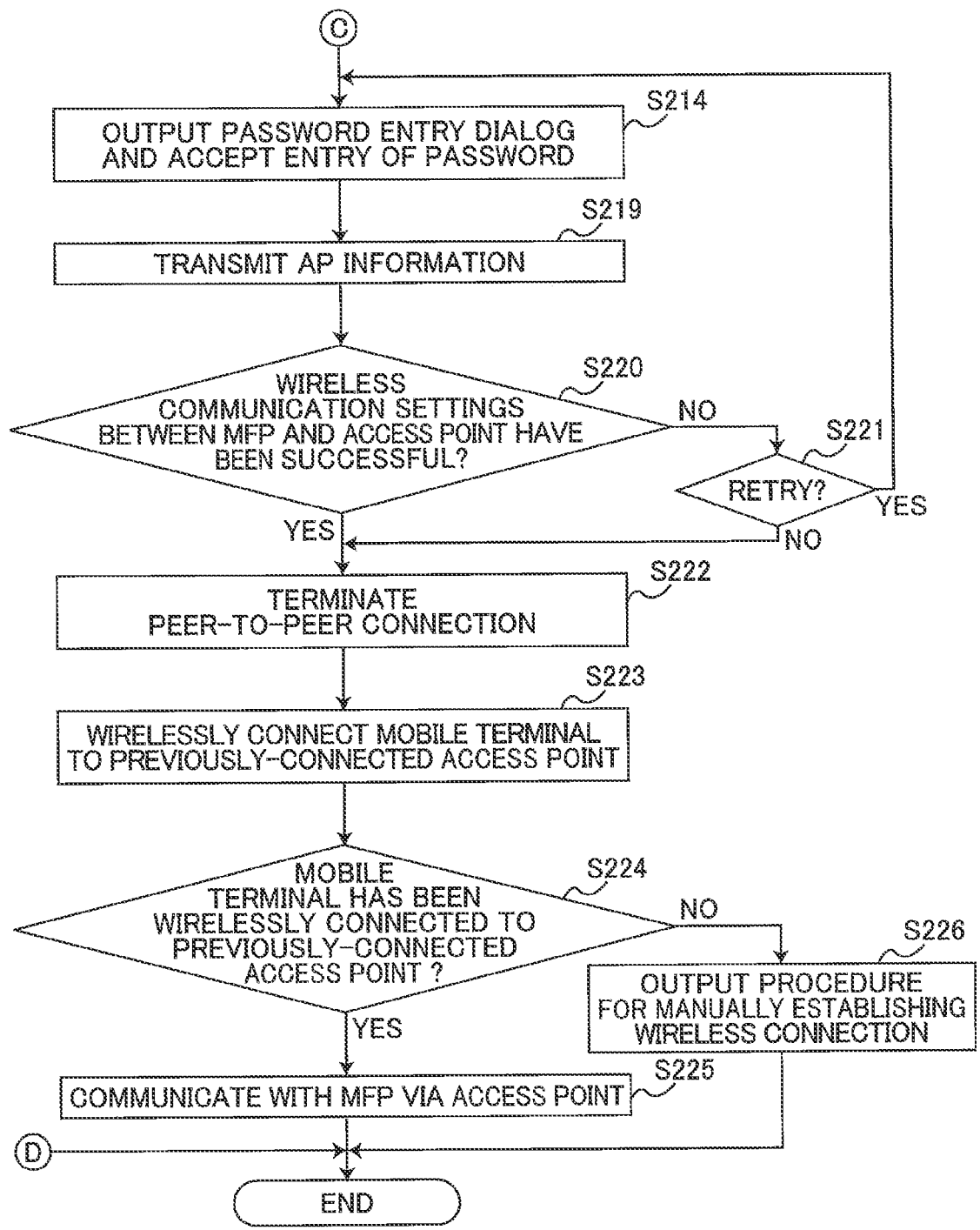
FIG. 7 is a continuation of the flowchart of FIG. 6 in the second illustrative embodiment according to one or more aspects of the disclosure.

Referring to FIGS. 6 and 7, the AP designation process executed by the controller 130 according to the second illustrative embodiment will be described.

The AP designation process starts in response to an NFC Touch event after the user starts the MFP application program 140 on the mobile terminal 100. The AP designation is executed as described below.

Figure 8:
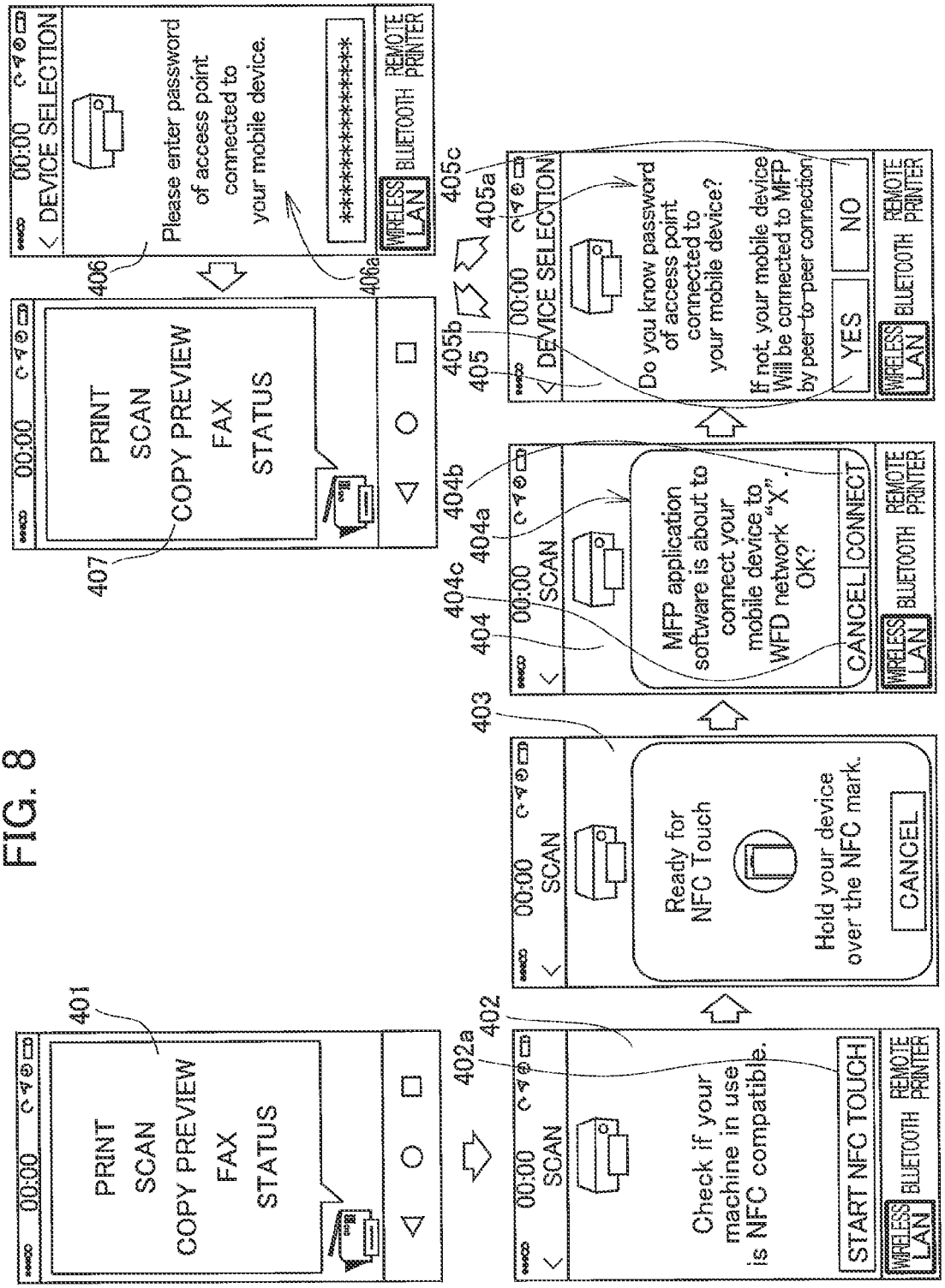
FIG. 8 is a screen flow diagram illustrating various screens to be displayed on a display of a mobile terminal in the AP designation process in the second illustrative embodiment according to one or more aspects of the disclosure.

The user starts the MFP application program 140 on the mobile terminal 100. After the start of the MFP application program 140, a home screen first appears on the display 114. In response to the user selecting a predetermined virtual button on the home screen, the home screen disappears and a screen 401 then appears on the display 114 (refer to FIG. 8). The screen 401 is a screen for receiving a user instruction instructing the MFP 10 to execute a task. More specifically, the screen 401 enables the user to select a task for the MFP 10 among various tasks. In response to the user selecting a specific task (e.g., scanning), the screen 401 disappears and a screen 402 appears on the display 114. The screen 401 is an example of the claimed "fourth screen".

The screen 402 includes a virtual button 402a labeled "START NFC TOUCH". In response to the user selecting the virtual button 402a ("START NFC TOUCH"), the screen 402 disappears and a screen 403 appears on the display 114.

The screen 403 is a screen for prompting the user to bring the mobile terminal 100 close to the MFP 10 so that a distance between the mobile terminal 100 and the MFP 10 falls within the maximum communicable range in the NFC communication. Specifically, the screen 403 includes a message "READY FOR NFC TOUCH" and a message "HOLD YOUR DEVICE OVER THE NFC MARK". In response to the user bringing the mobile terminal 100 close to the MFP 10 in a state where the messages (i.e., the screen 403) are displayed on the display 114, the AP designation process starts. It is assumed that the mobile terminal 100 is wirelessly connected to the access point ACP and the MFP 10 operates in the G/O status. The screen 403 is an example of the claimed "fifth screen".

Details of steps S201 and S202 of FIG. 6 are the same or similar to the details of steps S101 and S102 of FIG. 2, respectively. If the controller 130 determines that the mobile terminal 100 is currently connected to the MFP 10 via the access point ACP to which the mobile terminal 100 is currently wirelessly connected (YES in step S202), the routine proceeds to step S203.

In step S203, the controller 130 transmits a task command to the MFP 10 through Wi-Fi communication via the access point ACP to instruct the MFP 10 to execute a specific task (e.g., printing or scanning) corresponding to the task command. In response to completing step S203, the controller 130 ends the AP designation process (refer to FIGS. 6 and 7).

If the controller 130 determines that the mobile terminal 100 is not currently connected to the MFP 10 via the access point ACP to which the mobile terminal 100 is currently wirelessly connected (NO in step S202), the routine proceeds to step S204.

In step S204, the controller 130 terminates the wireless connection established between the mobile terminal 100 and the access point ACP. In the first illustrative embodiment, the mobile terminal 100 is a WFD-enabled device. Thus, the mobile terminal 100 according to the first illustrative embodiment can establish a peer to peer connection with the MFP 10 through Wi-Fi communication (more specifically, WFD communication) while being connected to the access point ACP. On the other hand, in the second illustrative embodiment, the mobile terminal 100 is a legacy device. Thus, for establishing a peer to peer connection with the MFP 10 through Wi-Fi communication, the mobile terminal 100 according to the second illustrative embodiment needs to terminate the wireless connection currently established with the access point ACP (i.e., the mobile terminal 100 according to the second illustrative embodiment needs to change the wireless connection destination from the access point ACP to the MFP 10).

Details of step S205 of FIG. 6 are the same or similar to the details of step S103 of FIG. 2. In the second illustrative embodiment, the OS program 136 attempts to establish, using the SSID and password of the WFD network included in the connection information, a peer to peer connection through Wi-Fi communication (more specifically, WFD communication). The mobile terminal 100 (i.e., the legacy device) participates in the WFD network as a child station according to the Wi-Fi protocol but not as a client according to the WFD protocol.

In step S206, the controller 130 determines whether a peer to peer connection has been established between the mobile terminal 100 and the MFP 10. If, in step S206, the controller 130 determines that a peer to peer connection has not been established between the mobile terminal 100 and the MFP 10, the routine proceeds to step S207.

In step S207, the controller 130 determines whether a predetermined period of time has elapsed since the controller 130 executed step S205. If the controller 130 determines that the predetermined period of time has not elapsed (NO in step S207), the routine returns to step S206. If the controller 130 determines that the predetermined period of time has elapsed (YES in step S207), the controller 130 ends the AP designation (refer to FIGS. 6 and 7).

If, in step S206, the controller 130 determines a peer to peer connection has been established between the mobile terminal 100 and the MFP 10 (YES in step S206), the routine proceeds to step S208. In step S208, the controller 130 transmits a task command to the MFP 10 through the peer to peer connection.

Details of steps S209 to S214 of FIG. 6 are the same or similar to the details of steps S104 to S109 of FIG. 2, respectively. In the second illustrative embodiment, the establishment of the peer to peer connection between the mobile terminal 100 and the MFP 10 is completed before the controller 130 transmits a task command to the MFP 10 in step S208. Thus, the AP designation process according to the second illustrative embodiment does not include steps corresponding to steps S112 and S114 (refer to FIG. 2) according to the first illustrative embodiment.

In step S213, the controller 130 determines whether a virtual button 405b labeled "YES" has been selected for the access point to which the mobile terminal 100 was previously connected (hereinafter, referred to as the "previously-connected AP") instead of the access point to which the mobile terminal 100 is currently connected. Note that, in the second illustrative embodiment, the connection-target access point is the previously-connected AP.

The previously-connected AP denotes the access point to which the mobile terminal 100 was connected immediately before the mobile terminal 100 establishes a peer to peer connection with the MFP 10 in step S205, that is, the access point whose wireless connection with the mobile terminal 100 was disconnected in step S204.

If, in step S213, the controller 130 determines that the virtual button 405b ("YES") has not been selected for the previously-connected AP, that is, a virtual button 405c labeled "NO" has been selected for the previously-connected AP (NO in step S213), the routine proceeds to step S215. In step S215, the controller 130 causes the mobile terminal 100 to communicate with the MFP 10 through the peer to peer connection. In other words, in step S215, the mobile terminal 100 performs Wi-Fi communication directly with the MFP 10 (more specifically, WFD communication with the MFP 10). In step S215, for example, the controller 130 transmits another task command to the MFP 10. In response to completing step S215, the controller 130 ends the AP designation process (refer to FIGS. 6 and 7).

Details of steps S216 and S217 of FIG. 6 are the same or similar to the details of steps S110 and S111 of FIG. 2, respectively. Details of step S218 are the same or similar to the details of step S215. In response to completing step S218, the controller 130 ends the AP designation process (refer to FIGS. 6 and 7).

In step S216, the controller 130 determines whether the virtual button 405c ("NO") was selected before for the previously-connected AP. Details of steps S219, S220, and S221 of FIG. 6 are the same or similar to the details of steps S117, S118, and S120 of FIG. 2, respectively.

If, in step S220, the controller 130 determines that a wireless connection between the MFP 10 and the connection-target access point (i.e., the previously-connected AP) has been established (i.e., wireless communication setting for the access point and the MFP 10 has been successful) (YES in step S220), the routine proceeds to step S222.

If the controller 130 determines in step S220 that a wireless connection between the MFP 10 and the connection-target access point (NO in step S220) has not been established and then determines in step S221 that the user operation indicates non-execution of a retry for the establishment of a wireless connection between the MFP 10 and the connection-target access point (i.e., a retry for wireless communication setting for the access point and the MFP 10) (e.g., NO in step S221), the routine also proceeds to step S222.

In step S222, the controller 130 terminates the peer to peer connection established between the mobile terminal 100 and the MFP 10. In step S223, the controller 130 then instructs the OS program 136 to attempt to establish a wireless connection between the mobile terminal 100 and the previously-connected AP. That is, the controller 130 instructs the OS program 136 to change the current connection destination and method from the peer to peer connection with the MFP 10 to a wireless connection with the previously-connected AP.

In step S224, the controller 130 determines whether the mobile terminal 100 is wirelessly connected to the previously-connected AP. Whether or not the mobile terminal 100 is allowed to wirelessly connect to the previously-connected AP automatically depends on the OS program 136. More specifically, the OS program 136 may have a function of designating the previously-connected AP and performing automatic establishment of a wireless connection with the previously-connected AP or may not have such a function but only a function of terminating the peer to peer connection established between the mobile terminal 100 and the MFP 10. That is, the determination results in step S224 depend on the OS program 136 installed on the mobile terminal 100.

If, in step S224, the controller 130 determines that the mobile terminal 100 has been wirelessly connected to the previously-connected AP (YES in step S204), the routine proceeds to step S225. In step S225, the controller 130 causes the mobile terminal 100 to communicate with the MFP 10 via the connection-target access point. In other words, the mobile terminal 100 performs Wi-Fi communication with the MFP 10 via the access point. In step S225, for example, the controller 130 transmits another task command to the MFP 10. In response to completing step S225, the controller 130 ends the AP designation process (refer to FIGS. 6 and 7).

If, in step S224, the controller 130 determines that the mobile terminal 100 has not been wirelessly connected to the previously-connected AP (NO in step S204), the routine proceeds to step S226. In step S226, the controller 130 displays, on the display 114, a procedure for manually establishing a wireless connection with the previously-connected AP (hereinafter, also referred to as the "manual wireless connection"). In other words, in step S226, the controller 130 displays a screen enabling the user to manually establish a wireless connection between the mobile terminal 100 and the previously-connected AP. The screen displayed in step S226 is an example of the claimed "seventh screen".

The manual wireless connection denotes establishing a wireless connection between the mobile terminal 100 and the previously-connected AP by a user manually entering the password of the previously-connected AP. In one example, in step S222, the controller 130 may display the SSID of the previously-connected AP. In another example, the screen currently displayed on the display 114 may include a virtual button for changing the screen to a wireless LAN settings screen of the OS program 136. In response to completing step S226, the controller 130 ends the AP designation process (refer to FIGS. 6 and 7).

2-3. Specific Example Case

Referring to FIG. 9, a specific example case implemented by the AP designation process (refer to FIGS. 6 and 7) executed in the second illustrative embodiment will be described.

Details of steps T201 to T205 of FIG. 7 are the same or similar to the details of steps T101 to T105 of FIG. 4, respectively. However, in steps T201, T203, and T204, screens 402, 403, and 404 (refer to FIG. 8) appear on the display 114 instead of the screens 303, 304, and 305 (refer to FIG. 4). As in the screen 305, the screen 404 includes a connection permission dialog 404a containing a virtual button 404b labeled "CONNECT" and a virtual button 404c labeled "CANCEL".

In step T206, the mobile terminal 100 transmits a task command to the MFP 10 through the peer to peer connection established with the MFP 10. In step T207, the mobile terminal 100 receives, from the MFP 10, a task completion message as a response to the task command. The task completion message indicates that a specific task has been completed.

Details of steps T208 to T214 of FIG. 9 are the same or similar to the details of steps T106 to T112 of FIG. 4, respectively. However, in steps T208 to T212, screens 405 and 406 (refer to FIG. 8) appear on the display 114 in place of the screens 306 and 307 (refer to FIG. 4), respectively. As in the screen 306, the screen 405 includes a confirmation dialog 405a containing the virtual button 405b ("YES") and the virtual button 405c ("NO"). As in the screen 307, the screen 406 includes a password entry dialog 406a. The password entry dialog 406a is an example of the claimed "first screen" and also is an example of the claimed "sixth screen". The confirmation dialog 405a is an example of the claimed "second screen" and also is an example of the claimed "third screen".

In step T215, the mobile terminal 100 terminates the peer to peer connection established with the MFP 10. It is assumed, in this example case, that the mobile terminal 100 might not establish a wireless connection with the previously-connected AP automatically (NO in step S224) although the controller 130 of the mobile terminal 100 instructs the OS program 136 to attempt to establish a wireless connection with the previously-connected AP. Thus, in step T216, the mobile terminal 100 displays, on the display 114, the procedure for manually establishing a wireless connection between the mobile terminal 100 and the previously-connected AP.

2-4. Effects

According to the second illustrative embodiment, the following effects can be achieved in addition to the effects achieved by the first illustrative embodiment.

In the second illustrative embodiment, after the mobile terminal 100 transmits a task command to the MFP 10 (e.g., after step S208), the controller 130 executes step S214 to display the password entry dialog 307a on the display 114. This configuration can thus avoid displaying of the password entry dialog 307a over the task screen (e.g., the screens 402 and 403 in FIG. 8), thereby reducing bothering the user.

In the second illustrative embodiment, if, in step S224, the controller 130 determines that the mobile terminal 100 is not wirelessly connected to the previously-connected AP (e.g., NO in step S224), the automatic establishment of a wireless connection with the previously-connected AP has been failed. The controller 130 thus displays, on the display 114, a screen including the procedure for manually establishing a wireless connection between the mobile terminal 100 and the previously-connected AP. Such a configuration thus enables the user to easily connect the mobile terminal 100 to the previously-connected AP manually if the mobile terminal 100 does not establish a wireless connection with the previously-connected AP automatically. Consequently, the mobile terminal 100 and the MFP10 can be surely connected to each other via the previously-connected AP.

3. Alternative Embodiments

While the disclosure has been described in detail with reference to the specific embodiments, these are merely examples, and various changes, arrangements and modifications may be applied thereto.

(1) In the illustrative embodiments, NFC communication is employed as the claimed "communication using the first communication method". However, the claimed "communication using the first communication method" is not limited to NFC communication and may be, for example, communication through a USB cable or through Bluetooth Low Energy ("BLE") (Bluetooth is a registered trademark owned by BLUETOOTH SIG. INC. of Kirkland, Wash.).

(2) The illustrative embodiments employ Wi-Fi communication as the claimed "communication using the second communication method". However, the claimed "communication using the second communication method" need not necessarily be Wi-Fi communication but may be BLE communication in place thereof, for example. In a case where the claimed "communication using the first communication method" is not NFC communication, the claimed "communication using the second communication method" may be NFC communication.

(3) In the illustrative embodiments, communication through a peer to peer connection established using Wi-Fi communication is used as the claimed "communication using the third communication method". However, the claimed "communication using the third communication method" is not limited but may be BLE communication or NFC communication, for example.

(4) In the illustrative embodiments, the controller 130 instructs the OS program 136 to attempt to establish a peer to peer connection between the mobile terminal 100 and the MFP 10 (e.g., step S103 or S205) before enabling the user to enter the password of the connection-target access point via the password entry dialog 307*a* or 406*a* (e.g., step S109 or S214). Nevertheless, the sequence of such steps may be changed. For example, the controller 130 may instruct the OS program 136 to attempt to establish a peer to peer connection between the mobile terminal 100 and the MFP 10 (e.g., step S103 or S205) after enabling the user to enter the password of the connection-target access point via the password entry dialog 307*a* or 406*a* (e.g., step S109 or S214).

(5) In the illustrative embodiments, in response to the mobile terminal 100 performing NFC communication with the MFP 10, the controller 130 displays the password entry dialog 307*a*. Nevertheless, the sequence of such steps may be changed. For example, the mobile terminal 100 may perform NFC communication with the MFP 10 after displaying the password entry dialog 307*a* (e.g., step S109 or S214). In such case, for example, the screen 302, the screen 307, and the screen 304 may appear in this order on the display 114. In other words, step S109 (refer to FIG. 3), NFC communication with the MFP 10, and step S105 may be executed in this order.

(6) In the illustrative embodiments, for example, the AP information may be transmitted through NFC communication. In other words, the AP information may be transmitted through the claimed "communication using the first communication method".

(7) In the second illustrative embodiment, the controller 130 transmits a task command to the MFP 10 before performing the AP designation for the MFP 10. Nevertheless, for example, the controller 130 may transmit a task command to the MFP 10 via the access point ACP after performing the AP designation for the MFP 10.

(8) Although the mobile terminal 100 is a WFD-enabled device in the first illustrative embodiment, the mobile terminal 100 according to the first illustrative embodiment may be a legacy device instead of the WFD-enabled device. In such a case, the mobile terminal 100 may include two Wi-Fi I/Fs for wirelessly connecting to the access point ACP and the MFP 10 simultaneously using Wi-Fi communication. Alternatively, the controller 130 may terminate the currently-established connection similarly to step S204 or S222 of the AP designation process (refer to FIGS. 7 and 8).

In the second illustrative embodiment, the mobile terminal 100 as a legacy device is used. However, the mobile terminal 100 according to the second illustrative embodiment may be a WFD-enabled device, for example. In such a case, the mobile terminal 100 may be configured to establish a wireless connection with the access point ACP and a peer to peer connection with the MFP 10 simultaneously. Further, the controller 130 may skip step S204 of FIG. 6 and step S222 of FIG. 7.

(9) In the illustrative embodiments, for example, the password entry dialog 307*a* or 406*a* may be displayed on the display 114 without displaying the confirmation dialog 306*a* or 405*a* inquiring of the user whether the user knows the password of the connection-target access point through the confirmation dialog 306*a* or 405*a*. In such a case, for example, a cancel button for enabling the user to reject entry of the password may be displayed on the display 114 together with the password entry dialog 307*a* or 406*a*. In this case, in response to the user selecting the cancel button, the controller 130 may execute steps S112 to S114 (i.e., the steps to be executed if a negative determination ("NO") is made in step S108).

If the controller 130 determines that the mobile terminal 100 can connect to another access point different from the access point to which the mobile terminal 100 is currently connected, the controller 130 may display the password entry dialog 307*a* or 406*a* on the display 114 without displaying the confirmation dialog 306*a* or 405*a* inquiring of the user whether the user knows the password of the connection-target access point. In such a case, if the controller 130 determines that the access point to which the mobile terminal 100 is currently connected is different from the access point to which the mobile terminal 100 was previously connected, the controller 130 may display the password entry dialog 307*a* or 406*a* on the display 114 without displaying the confirmation dialog 306*a* or 405*a*.

(10) In the second illustrative embodiment, the controller 130 may skip steps S215 and S218 in the AP designation process (refer to FIGS. 6 and 7).

(11) In step S102 of the AP designation process according to the first illustrative embodiment and in step S202 of the AP process according to the second illustrative embodiment, the controller 130 determines, based on the settings-completed AP information, whether the mobile terminal 100 is currently connected to the MFP 10 via the access point to which the mobile terminal 100 is currently wirelessly connected. In the illustrative embodiments, the settings-completed AP information is the SSID of the access point to which the MFP 10 is currently wirelessly connected. Nevertheless, for example, the settings-completed AP information may be a MAC address of the MFP 10. In such a case, the mobile terminal 100 may transmit a PING signal, using the MAC address of the MFP 10, via the access point to which the mobile terminal 100 is currently connected. In response to receiving from the MFP 10 a response to the PING signal, the controller 130 may determine in step S102 (refer to FIG. 2) that the mobile terminal 100 is currently connected to the MFP 10 via the access point.

Although the mobile terminal 100 and the MFP 10 are connected to the same access point, some router setting may interfere with establishment of a wireless connection between the mobile terminal 100 and the MFP 10 via the access point. Even when such a situation happens, the determination as described above using a MAC address as the settings-completed AP information may reduce erroneous determination that the mobile terminal 100 is currently connected to the MFP 10 via the access point.

Both of the SSID of the access point and the MAC address of the MFP 10 may be used as the settings-completed AP information. That is, the controller 130 may determine, based on both of the access point and the MAC address of the MFP 10, whether the mobile terminal 100 is currently connected to the MFP 10 via the access point to which the mobile terminal 100 is currently wirelessly connected.

(12) A plurality of functions that a single element in the illustrative embodiments has may be implemented by a combination of a plurality of elements, or a single function that a single element in the illustrative embodiments has may be implemented by a combination of a plurality of elements. A plurality of functions that a combination of a plurality of elements in the illustrative embodiments have may be implemented by a single element, or a single function that a combination of a plurality of elements in the illustrative embodiments may be implemented by a single element. In the illustrative embodiments, one or more elements or configurations may be omitted. In the illustrative embodiments, at least a part of the configuration according to one embodiment may be added to the configuration according to another embodiment, or at least a part of the configuration according to one embodiment may be substituted by at least a part of the configuration according to another embodiment.

What is claimed is:

1. A non-transitory computer-readable storage medium storing computer-readable instructions for a mobile terminal,
   the mobile terminal comprising:
   a processor; and
   a Wi-Fi interface enabling the mobile terminal to perform wireless communication using a Wi-Fi communication method,
   the computer-readable instructions, when executed by the processor, causing the mobile terminal to perform:
   in a case where a wireless connection between the mobile terminal and a communication device via an access point is not established,
   transmitting access point information to the communication device, the access point information including:
   first identification information for identifying the access point; and
   a password of the access point; and
   communicating with the communication device via the access point using the Wi-Fi interface after a wireless connection between the communication device and the access point is established using the transmitted access point information; and
   in a case where a wireless connection between the mobile terminal and the communication device via the access point is established,
   communicating with the communication device via the access point using the Wi-Fi interface without transmitting the access point information.

2. The non-transitory computer-readable storage medium according to claim 1,
   wherein the computer-readable instructions, when executed by the processor, cause the mobile terminal to further perform:
   determining whether the wireless connection between the mobile terminal and the communication device via the access point is established,
   wherein the access point information is transmitted in a case where it is determined that the wireless connection between the mobile terminal and the communication device via the access point is not established, and
   wherein the access point information is not transmitted in a case where it is determined that the wireless connection between the mobile terminal and the communication device via the access point is established.

3. The non-transitory computer-readable storage medium according to claim 2,
   wherein the mobile terminal further comprises a specific communication interface enabling the mobile terminal to perform communication using a communication method different from the Wi-Fi communication method,
   wherein the computer-readable instructions, when executed by the processor, cause the mobile terminal to further perform:
   acquiring specific information from the communication device through the specific communication interface, and
   wherein, after the specific information is acquired, the determining is performed using the acquired specific information.

4. The non-transitory computer-readable storage medium according to claim 3,
   wherein the specific information includes second identification information for identifying an access point, and
   wherein, in a case where the first identification information matches the second identification information included in the acquired specific information, it is determined that a wireless connection between the mobile terminal and the communication device via the access point is established.

5. The non-transitory computer-readable storage medium according to claim 3,
   wherein the specific information includes a MAC address of the communication device, and
   wherein the determining is performed using the MAC address included in the acquired specific information.

6. The non-transitory computer-readable storage medium according to claim 5,
   wherein the computer-readable instructions, when executed by the processor, cause the mobile terminal to further perform:
   transmitting a PING signal using the MAC address via the access point through the Wi-Fi interface after the specific information is acquired,
   wherein, in response to a response to the PING signal being received from the communication device, it is determined that the wireless connection between the mobile terminal and the communication device via the access point is established.

7. The non-transitory computer-readable storage medium according to claim 1,
   wherein the mobile terminal further comprises a user interface,
   wherein the computer-readable instructions, when executed by the processor, cause the mobile terminal to further perform:
   receiving the password of the access point via the user interface, and
   wherein the access point information includes the received password.

8. The non-transitory computer-readable storage medium according to claim 1,
   wherein the access point information is transmitted via the Wi-Fi interface.

9. The non-transitory computer-readable storage medium according to claim 1,
   wherein the mobile terminal further comprises a specific communication interface enabling the mobile terminal to perform specific communication using a communication method different from the Wi-Fi communication method,
   wherein the access point information is transmitted via the specific communication interface.

10. A mobile terminal comprising:
a Wi-Fi interface for performing wireless communication using a Wi-Fi communication method; and
a controller configured to perform:
   in a case where a wireless connection between the mobile terminal and a communication device via an access point is not established,
     transmitting access point information to the communication device, the access point information including:
       identification information for identifying the access point; and
       a password of the access point; and
     communicating with the communication device via the access point using the Wi-Fi interface after a wireless connection between the communication device and the access point is established using the transmitted access point information; and
   in a case where a wireless connection between the mobile terminal and the communication device via the access point is established,
     communicating with the communication device via the access point using the Wi-Fi interface without transmitting the access point information.

11. A communication device comprising:
a Wi-Fi interface for performing wireless communication using a Wi-Fi communication method; and
a controller configured to perform:
   in a case where a wireless connection between the communication device and a mobile terminal via an access point is not established,
     receiving access point information from the mobile terminal, the access point information including:
       first identification information for identifying the access point; and
       a password of the access point;
     establishing a wireless connection between the communication device and the access point using the received access point information; and
     communicating with the mobile terminal via the access point using the Wi-Fi interface after the wireless connection with the access point is established; and
   in a case where a wireless connection between the communication device and the mobile terminal via the access point is established,
     communicating with the mobile terminal via the access point using the Wi-Fi interface without receiving the access point information.

12. The communication device according to claim 11, further comprising a specific communication interface for performing communication using a communication method different from the Wi-Fi communication method,
wherein the controller is configured to further perform:
   transmitting specific information to the mobile terminal via the specific communication interface.

13. The communication device according to claim 12, wherein the specific information includes second identification information for identifying an access point.

14. The communication device according to claim 12, wherein the specific information includes a MAC address of the communication device.

15. The communication device according to claim 11, wherein the access point information is received via the Wi-Fi interface.

16. The communication device according to claim 11, wherein the communication device further comprises a specific communication interface for performing communication using a communication method different from the Wi-Fi communication method,
wherein the access point information is received via the specific communication interface.

17. The communication device according to claim 16, wherein the specific communication interface is a Near Field Communication interface.

18. The communication device according to claim 16, wherein the specific communication interface is a Bluetooth interface.

19. The communication device according to claim 11, wherein the first identification information is a Service Set Identifier.

20. The communication device according to claim 11, wherein a task command is received from the mobile terminal in the communicating with the mobile terminal via the access point.

* * * * *